United States Patent
Masuda et al.

(10) Patent No.: US 7,321,459 B2
(45) Date of Patent: Jan. 22, 2008

(54) IMAGE DISPLAY DEVICE AND METHOD

(75) Inventors: Yoshitomo Masuda, Hamura (JP); Gaku Yakushiji, Higashiyamato (JP); Kazuya Murata, Kodaira (JP); Norio Nihei, Kodaira (JP); Koji Takagi, Kawasaki (JP); Itsuo Tanuma, Sayama (JP); Hajime Kitano, Kodaira (JP); Takahiro Kawagoe, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 157 days.

(21) Appl. No.: 10/506,533

(22) PCT Filed: Mar. 6, 2003

(86) PCT No.: PCT/JP03/02645

§ 371 (c)(1),
(2), (4) Date: Aug. 15, 2005

(87) PCT Pub. No.: WO03/075087

PCT Pub. Date: Sep. 12, 2003

(65) Prior Publication Data

US 2006/0033849 A1    Feb. 16, 2006

(30) Foreign Application Priority Data

Mar. 6, 2002   (JP) ............... 2002-060760
May 8, 2002    (JP) ............... 2002-133171

(51) Int. Cl.
*G02B 26/00* (2006.01)
*G09G 3/34* (2006.01)
*G02F 1/13* (2006.01)

(52) U.S. Cl. .................. 359/296; 345/107; 345/48; 349/2

(58) Field of Classification Search ............... 359/296; 345/107, 48; 349/2
See application file for complete search history.

(56) References Cited

U.S. PATENT DOCUMENTS

| 6,407,763 B1 | 6/2002 | Yamaguchi et al. |
| 6,842,278 B1* | 1/2005 | Sakamaki et al. .......... 359/296 |
| 2002/0024620 A1 | 2/2002 | Miyamoto et al. |

(Continued)

FOREIGN PATENT DOCUMENTS

EP    0 709 719 A1    5/1996

(Continued)

OTHER PUBLICATIONS

European Search Report (Nov. 10, 2005).

*Primary Examiner*—Evelyn A. Lester
(74) *Attorney, Agent, or Firm*—Sughrue Mion, Pllc.

(57) ABSTRACT

In the image display device according to the first aspect of the invention, a liquid powder composed of a solid material stably floating as a dispersant in a gas and exhibiting a high fluidity in an aerosol state is sealed between opposed substrates, at least one substrate being transparent, and the liquid powder is moved. Moreover, in the image display device according to the second aspect of the invention, a porous spacer is arranged between opposed substrates, at least one substrate being transparent, a liquid powder composed of a solid material stably floating as a dispersant in gas and exhibiting a high fluidity in an aerosol state is sealed, and the liquid powder is moved.

30 Claims, 8 Drawing Sheets

U.S. PATENT DOCUMENTS

| | | | |
|---|---|---|---|
| 2002/0051280 A1* | 5/2002 | Matsunaga et al. | 359/296 |
| 2005/0285500 A1* | 12/2005 | Hattori et al. | 313/483 |
| 2006/0087479 A1* | 4/2006 | Sakurai et al. | 345/48 |
| 2006/0087489 A1* | 4/2006 | Sakurai et al. | 345/107 |
| 2006/0231401 A1* | 10/2006 | Sakurai et al. | 204/471 |
| 2006/0263927 A1* | 11/2006 | Sakurai et al. | 438/73 |

FOREIGN PATENT DOCUMENTS

| | | |
|---|---|---|
| JP | 2001-290178 A | 10/2001 |
| JP | 2001-312225 A | 11/2001 |

\* cited by examiner

IMAGE DISPLAY DEVICE AND METHOD

TECHNICAL FIELD

The present invention relates to an image display device and method wherein images can be displayed or eliminated by a movement of particles utilizing electrostatic force.

BACKGROUND ART

As an image display device substitutable for liquid crystal display (LCD), image display devices with the use of technology such as an electrophoresis method, an electrochromic method, a thermal method, dichroic-particles-rotary method are proposed.

As for these image display device, it is conceivable as inexpensive visual display device of the next generation from a merit having wide field of vision close to normal printed matter, having smaller consumption with LCD, spreading out to a display for portable device, and an electronic paper is expected.

Recently, electrophoresis method is proposed that microencapsulate dispersion liquid made up with dispersion particles and coloration solution and dispose the liquid between faced substrates. However, in the electrophoresis method, there is a problem that a response speed is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] In this method, since no solution is used, it is possible to solve the problems in the electrophoresis method such as the particle sedimentation, aggregation and so on.

However, in the above method wherein use is made of a particle behavior in a gas between the substrates, a drive voltage is extremely increased. Therefore, there arises a drawback such that the particles cannot be moved if the drive voltage is over several hundred volt, while, in the electrophoresis method, the particles can be moved at several dozen volt. In the dry-type image display device mentioned above, the structure becomes complicated because the charge transport layer and further a charge generation layer are to be arranged on a part of the substrate. In addition, it is difficult to constantly dissipate charges from the electro-conductive particles, and thus there is a drawback on the lack of stability.

DISCLOSURE OF INVENTION

The first aspect of the invention relates to a new type image display device and method developed for solving the above problems, and has its object to provide an image display device and method which can extremely decrease a drive voltage and have an inexpensive and stable construction in a method of repeatedly displaying the image by utilizing electrostatic.

The inventors investigated for solving the above problems, and found that it is possible to obtain a new type image display device and method which can realize rapid response and also which can achieve inexpensive and stable construction and further decrease the drive voltage, by utilizing a liquid powder having a fluidity like a solution and an appearance maintaining property like a solid, thereby achieving the present invention.

That is, the first aspect of the invention provide the following image display device and method:

1. An image display device characterized in that a liquid powder composed of a solid material stably floating as a dispersant in a gas and exhibiting a high fluidity in an aerosol state is sealed between opposed substrates, at least one substrate being transparent, and the liquid powder is moved.
2. The image display device according to the above 1, wherein the liquid powder does not have a repose angle as an index indicating its fluidity.
3. The image display device according to the above 1 or 2, wherein an apparent volume in a maximum floating state is two times or more than that in none floating state.
4. The image display device according to one of the above 1-3, wherein a time change of the apparent volume of the liquid powder satisfies the floating formula:

$$V_{10}/V_5 > 0.8;$$

here, $V_5$ indicates the apparent volume ($cm^3$) of the liquid powder after 5 minutes from the maximum floating state; and $V_{10}$ indicates the apparent volume ($cm^3$) of the liquid powder after 10 minutes from the maximum floating state.

5. The image display device according to one of the above 1-4, wherein an average particle size d(0.5) of a particle material constituting the liquid powder is 0.1-20 μm.
6. The image display device according to one of the above 1-5, wherein a particle size distribution Span of the particle material constituting the liquid powder, which is defined by the following formula, is not more than 5:

$$Span = (d(0.9) - d(0.1))/d(0.5);$$

(here, d(0.5) means a value of the particle size expressed by μm wherein an amount of the particle material constituting the liquid powder having the particle size larger than this value is 50% and an amount of the particle material constituting the liquid powder having the particle size expressed by μm wherein an amount of the particle material constituting the liquid powder having a particle size smaller than this value is 10%, and d(0.9) means a value of the particle size expressed by μm wherein an amount of the particle material constituting the liquid powder having the particle size smaller than this value is 90%).

7. The image display device according to one of the above 1-6, wherein a solvent insoluble rate of the liquid powder, which is defined by the following formula, is not less than 50%:

$$\text{solvent insoluble rate } (\%) = (B/A) \times 100;$$

(here, A is a weight of the liquid powder before being immersed into the solvent and B is a weight of resin components after the liquid powder is immersed into good solvent at 25° C. for 24 hours).

8. The image display device according to one of the above 1-7, wherein the liquid powder is a material, a surface of which is bonded by inorganic fine particles having an average particle size of 20-100 nm.

9. The image display device according to the above 8, wherein the liquid powder is a material, a surface of which is bonded by two or more kinds of inorganic fine particles.
10. The image display device according to the above 8 or 9, wherein the inorganic fine particles are treated by silicon oil.
11. The image display device according to one of the above 1-10, wherein the liquid powder is sealed between the substrates by means of an electrostatic coating apparatus.
12. The image display device according to one of the above 1-11, wherein a space between the opposed substrates is filled with a gas having a relative humidity at 25° C. of not more than 60% RH.
13. The image display device according to one of the above 1-12, wherein the image display device is formed by a plurality of display cells.
14. The image display device according to one of the above 1-13, wherein a partition wall is formed by one of a screen-printing method, a sandblast method, a photoconductor paste method and an additive method.
15. The image display device according to one of the above 1-14, wherein the partition wall has a cantilever structure.
16. A method of displaying the image characterized in that a liquid powder composed of a solid material stably floating as a dispersant in a gas and exhibiting a high fluidity in an aerosol state is sealed between opposed substrates, at least one substrate being transparent, and the liquid powder is moved.

The second aspect of the invention relates to an image display device developed for solving the above problems, and has its object to provide an image display device which can achieve inexpensive construction, improve durability and decrease a drive voltage, by utilizing a liquid powder having a fluidity like a solution and an appearance maintaining property like a solid.

The inventors investigated for solving the above problems, and found, in the display device constructed by the opposed substrates and a material movable by Coulomb force, that it is possible to obtain an image display device which can achieve inexpensive construction, improve durability and decrease a drive voltage, by arranging a porous spacer in a space between the substrates in which the liquid powder movable by Coulomb's force is filled, thereby achieving the present invention.

That is, the second aspect of the invention provide the following image display device:

17. An image display device characterized in that a porous spacer is arranged between opposed substrates, at least one substrate being transparent, a liquid powder composed of a solid material stably floating as a dispersant in gas and exhibiting a high fluidity in an aerosol state is sealed, and the liquid powder is moved.
18. The image display device according to the above 17, wherein the liquid powder does not have a repose angle as an index indicating its fluidity.
19. The image display device according to the above 17 or 18, wherein hot melt adhesive is applied on an outer portion of the porous spacer.
20. The image display device according to one of the above 17-19, wherein an open rate of the porous spacer at a display side having a transparent substrate is 50-95%.
21. The image display device according to one of the above 17-20, wherein pore sizes of the porous spacer are different at a display side and at a none display side, and (pore size a display side)/(pore size at none display side)>1.1 is satisfied.
22. The image display device according to one of the above 17-21, wherein an apparent volume in a maximum floating state is two times or more than that in none floating state.
23. The image display device according to one of the above 17-22, wherein a time change of the apparent volume of the liquid powder satisfies the floating formula:

$$V_{10}/V_5 > 0.8;$$

here, $V_5$ indicates the apparent volume (cm$^3$) of the liquid powder after 5 minutes from the maximum floating state; and $V_{10}$ indicates the apparent volume (cm$^3$) of the liquid powder after 10 minutes from the maximum floating state.

24. The image display device according to one of the above 17-23, wherein an average particle size d(0.5) of a particle material constituting the liquid powder is 0.1-20 μm.
25. The image display device according to one of the above 17-24, wherein a particle size distribution Span of the particle material constituting the liquid powder, which is defined by the following formula, is not more than 5:

$$\mathrm{Span} = (d(0.9) - d(0.1))/d(0.5);$$

(here, d(0.5) means a value of the particle size expressed by μm wherein an amount of the particle material constituting the liquid powder having the particle size larger than this value is 50% and an amount of the particle material constituting the liquid powder having the particle size expressed by μm wherein an amount of the particle material constituting the liquid powder having a particle size smaller than this value is 10%, and d(0.9) means a value of the particle size expressed by μm wherein an amount of the particle material constituting the liquid powder having the particle size smaller than this value is 90%).

26. The image display device according to one of the above 17-25, wherein a solvent insoluble rate of the liquid powder, which is defined by the following formula, is not less than 50%:

$$\text{solvent insoluble rate } (\%) = (B/A) \times 100;$$

(here, A is a weight of the liquid powder before being immersed into the solvent and B is a weight of resin components after the liquid powder is immersed into good solvent at 25° C. for 24 hours).

27. The image display device according to one of the above 17-26, wherein the liquid powder is a material, a surface of which is bonded by inorganic fine particles having an average particle size of 20-100 nm.
28. The image display device according to the above 27, wherein the liquid powder is a material, a surface of which is bonded by two or more kinds of inorganic fine particles.
29. The image display device according to the above 27 or 28, wherein the inorganic fine particles are treated by silicon oil.
30. The image display device according to one of the above 17-29, wherein the liquid powder is sealed between the substrates by means of an electrostatic coating apparatus.
31. The image display device according to one of the above 17-30, wherein a space between the opposed substrates is filled with a gas having a relative humidity at 25° C. of not more than 60%

BEST MODE FOR CARRYING OUT THE INVENTION

Figure 1:
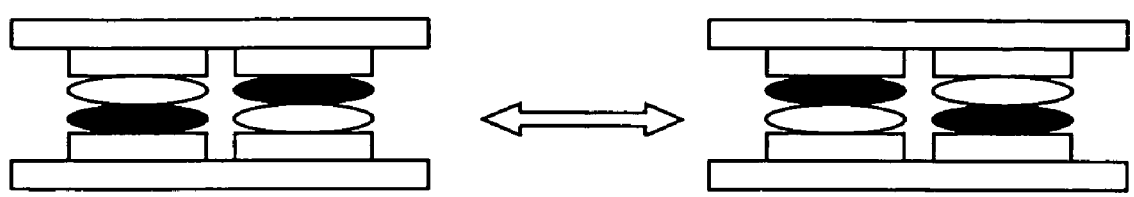
FIG. 1 is a schematic view explaining one embodiment of a display method in the image display device according to the invention.

In an image display panel utilizing electrostatic, an electric field is applied between opposed substrates, by means of some kind of means, to which particles are sealed. A negatively charged particle is attracted toward a portion of the substrate charged positively by means of Coulomb's force and so on, and a positively charged particle is attracted toward a portion of the substrate charged negatively by means of Coulomb's force and so on. An image display can be achieved by moving the particles in a reciprocating manner between the opposed substrates.

However, in the known image display device, there remain the following drawbacks if the stability both in the case of particle reciprocating state and particle maintaining state is to be realized. That is, if a solution that is a main affection is not used, we have no other choice to select an electrostatic display of dry type having a basic construction of the particles and the substrates, which is represented by a toner type display. On the other hand, if a drive voltage decreasing is to be realized, we also have no other choice to select an electrostatic display of wet type having a basic construction of the particles, the substrates and the solution sufficient for a particle migration, which utilizes an electrophoresis migration in the solution.

That is, the improvement of the stability both in the reciprocating state and the maintaining state by preventing sedimentation and aggregation and the improvement of the decreasing of the drive voltage are an antinomy, and thus it is difficult to realize these improvements at the same time.

In the present invention, use is made of a liquid powder movable by Coulomb's force and so on, which is an entirely new state material, as a display media. Thereby, it is possible to achieve an entirely new image display device and method, which can realize both of the improvement of the stability both in the reciprocating state and the maintaining state and the improvement of the decreasing of the drive voltage.

In the present invention, a term "liquid powder" means an intermediate material having both of liquid properties and particle properties and exhibiting a self-fluidity without utilizing gas force and liquid force. Preferably, it is a material having an excellent fluidity such that there is no repose angle defining a fluidity of powder.

For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book).

Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia)

In the present invention, it is found that the intermediate material having both of fluid properties and solid properties and exhibiting a self-fluidity without utilizing gas force and liquid force can be produced specifically, and this is defined as the liquid powder.

That is, as is the same as the definition of the liquid crystal (intermediate phase between a liquid and a solid), the liquid powder according to the invention is a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the image display device according to the invention, a solid material is used as a dispersant.

In the image display device according to the invention, the liquid powder composed of a solid material stably floating as a dispersant in a gas and exhibiting a high fluidity in an aerosol state is sealed between opposed substrates, at least one of which is transparent. The liquid powder can move easily and stably by Coulomb's force and so on driven by a low voltage.

Then, a method of measuring a repose angle, which is utilized as a preferable example, will be explained.

As an index showing a fluidity of the powder, a repose angle is widely used. This means an angle between a free surface of a powder layer and a horizontal surface when, in a gravitational field, the free surface of the powder layer becomes a critical stress state. The fluidity becomes better if this value becomes smaller.

However, the value of the repose angle is varied considerably by the measuring method even if the repose angle is measured for the same powder.

As the measuring method, the following three methods are known. 1) Filling method: the powder is filled from an upside to the horizontal surface so as to deposit the powder in a conical shape, and an inclination angle of its inclined plane is measured. 2) Discharging method: the powder filled in a vessel is discharged by gravitation e.g. by opening an outlet arranged at a bottom portion, and an inclination angle of free surface of a remaining layer is measured. 3) Inclination method: the powder is filled in a vessel, its free surface is smoothed in a flat manner, the vessel is inclined and an inclination angle at which the powder arranged on a surface starts to slip is measured.

If the repose angle of the liquid powder according to the present invention is measured according to the measuring methods mentioned above, there occur the following problems. In the 1) filling method, since the liquid powder cannot form a conical shape, its inclination angle cannot be measured. In the 2) discharging method, since the liquid powder cannot form a remaining layer, its inclination angle cannot be measured. In the 3) inclination method, since it is not possible to detect a state at which the liquid powder starts to slip, its inclination angle cannot be measured.

In this manner, the repose angle of the liquid powder according to the invention cannot be measured by the measuring methods mentioned above. That is, the liquid powder according to the invention is a material showing such a high fluidity that there is no repose angle.

Figure 2:
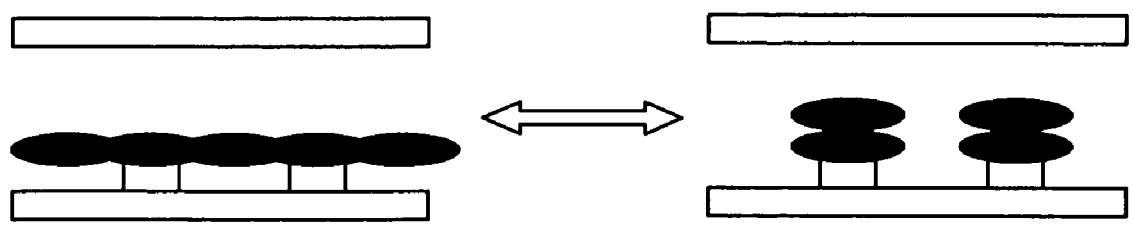
FIG. 2 is a schematic view explaining another embodiment of a display method in the image display device according to the invention.

An image display in the image display device according to the invention can be applied to a display method wherein the different liquid powders having two or more colors are moved in a vertical direction with respect to the substrate as shown in FIG. 1 and a display method wherein the liquid powder having one color is moved in a horizontal direction with respect to the substrate as shown in FIG. 2. For the sake of safety, the former display method is preferred.

Figure 3A:
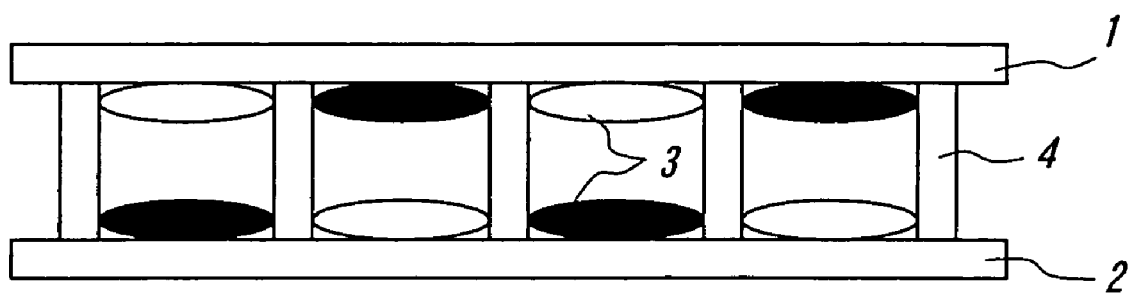
FIGS. 3a-3c are schematic view respectively explaining one embodiment of a structure of the image display device according to the invention.
Figure 3B:
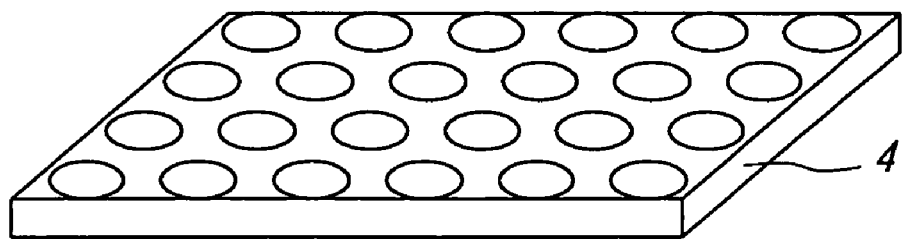
Figure 3C:
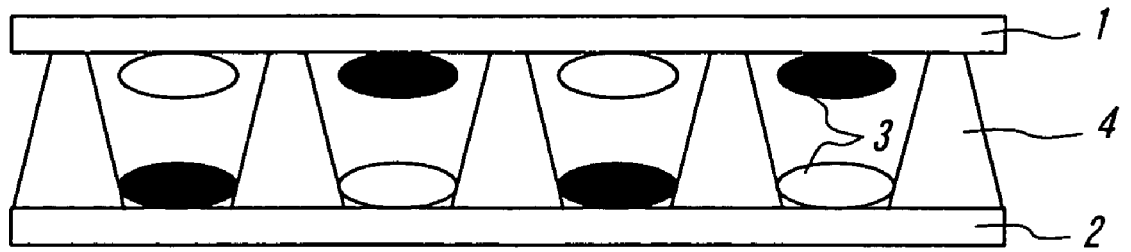

FIGS. 3a-3c are schematic views respectively explaining one embodiment of a structure of the image display device according to the invention. The image display device according to (the first aspect of) the invention is constructed as shown in FIG. 3a by opposed substrates 1 and 2, a liquid powder 3 between the substrates and a partition wall 4 that is arranged according to need. Moreover, the image display device according to (the second aspect of) the invention is constructed as shown in FIGS. 3b and 3c by the opposed substrates 1 and 2, the liquid powder 3 and a porous spacer 4.

In the image display device according to the invention, at least one of the substrates 1 and 2 is a transparent substrate through which a color of the liquid powder 3 can be observed from outside of the device, and it is preferred to use a material having a high transmission factor of visible light and an excellent heat resistance.

As the image display device, whether flexibility is necessary or not is suitably selected in accordance with its use. For example, it is preferred to use a material having flexibility for the use of electronic paper and so on, and it is preferred to use a material having no flexibility for the use of a display of portable device such as mobile phone, PDA, laptop computer and so on.

Examples of the substrate material include polymer sheets such as polyethylene terephthalate, polymer sulfone, polyethylene, or polycarbonate, and inorganic sheets such as glass, quartz or so.

The thickness of the substrate is preferably 2 to 5000 µm, more preferably 5 to 1000 µm. When the thickness is too thin, it becomes difficult to maintain strength and distance uniformity between the substrates, and when the thickness is too thick, vividness and contrast as a display capability degrade, and in particular, flexibility in the case of using for an electronic paper deteriorates.

An electrode may be arranged on the substrate according to need.

In the case of arranging no electrode on the substrate, the liquid powder charged in a predetermined characteristic and having a color is pulled in or rebounds with respect to the substrate by means of an electric field generated by applying an electrostatic latent image on an outer surface of the substrate. Then, the liquid powder aligned in accordance with the electrostatic latent image is observed from outside of the display device through the transparent substrate. In this case, the electrostatic latent image mentioned above can be generated for example by a method wherein an electrostatic latent image generated in a known electrophotography system using an electrophotography photo-conductor is transferred and formed on the substrate of the image display device according to the invention, or, by a method wherein an electrostatic latent image is directly formed on the substrate by an ion flow.

In the case of arranging an electrode on the substrate, the liquid powder charged in a predetermined characteristic and having a color is pulled in or rebounds with respect to the substrate by means of an electric field generated on respective electrodes formed on the substrate by applying an outer voltage thereto. Then, the liquid powder aligned in accordance with the electrostatic latent image is observed from outside of the display device through the transparent substrate.

In this case, the electrode may be formed of electroconductive materials which are transparent and having patter formation capability. As such electroconductive materials, indium oxide, metals such as aluminum, electrodonductive polymer such as polyaniline, polypyrrole, polythiophene and so on, formed by for example vacuum vapor deposition, coating and so on. Additionally, the thickness of the electrode may be suitable unless the electroconductivity is absent or any hindrance exists in optical transparency, and it is preferable to be 3 to 1000 nm, more preferable to be 5 to 400 nm. In this case, the applied outer voltage may be superimposed with a direct current or an alternate current.

In the image display device (first aspect) according to the invention, in order to prevent an unnecessary movement of the liquid powder in a direction parallel to the substrate, it is preferred to form a partition wall bridging the opposed substrates and to construct the display portion by a plurality of display cells.

A shape of the partition wall is suitably designed in accordance with a size of the liquid powder to be used for the display and is not restricted. However, it is preferred to set a width of the partition wall to 10-1000 µm more preferably 10-500 µm and to set a height of the partition wall to 10-5000 µm more preferably 10-500 µm.

Moreover, as a method of forming the partition wall, use may be made of a double rib method wherein ribs are formed on the opposed substrates respectively and they are connected with each other and a single rib method wherein a rib is formed on one of the opposed substrates only. In the image display device according to the invention, in order to prevent a connection deviation, it is preferred to use the single rib method for the partition wall formation.

Figure 4:
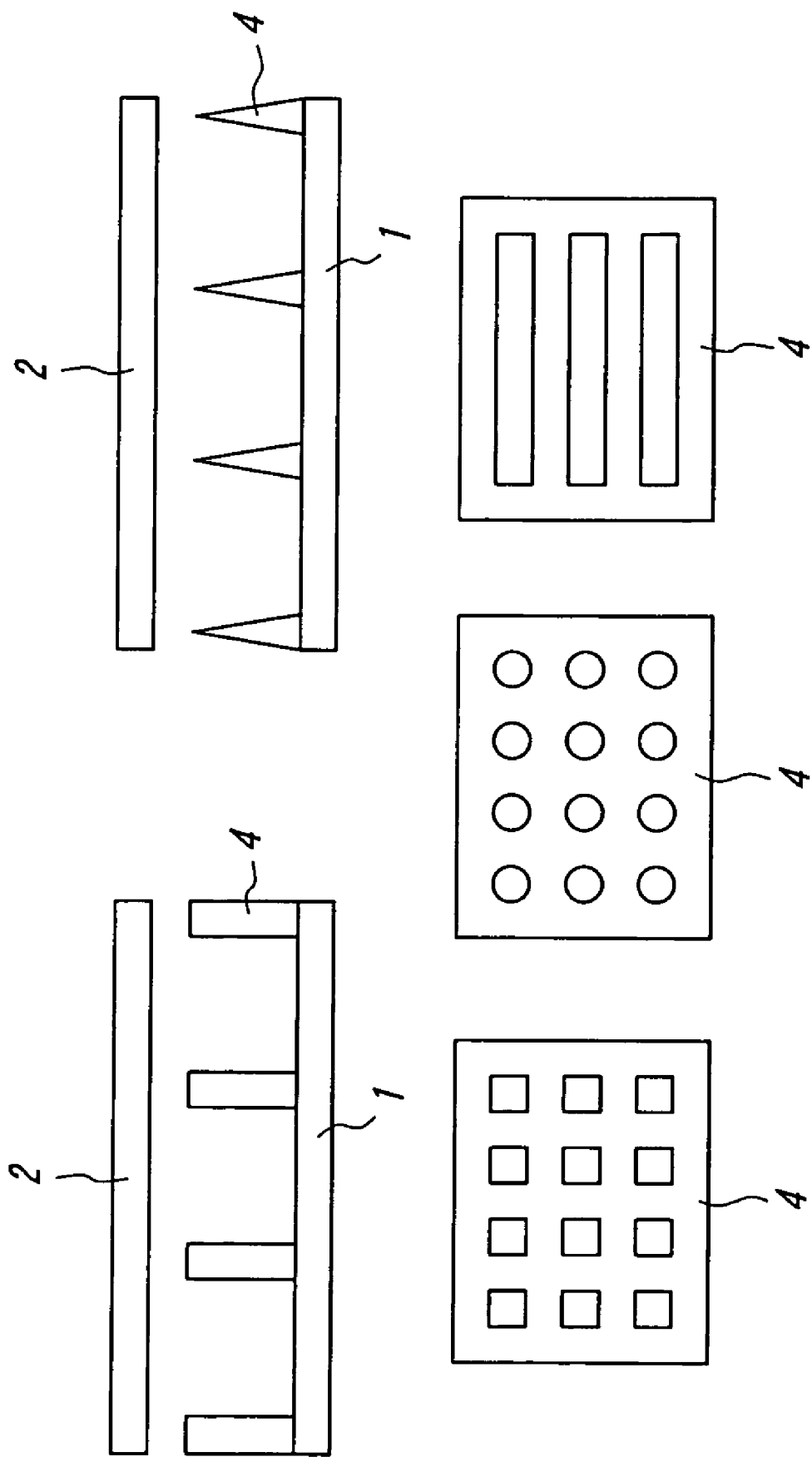
FIG. 4 is a schematic view showing one embodiment of a shape of partition walls in the image display device according to the invention.

The display cell formed by the partition walls each made of rib has a square shape, a triangular shape, a circular shape as shown in FIG. 4 viewed from a plane surface of the substrate.

It is better to minimize a portion (area of frame portion of the display cell) corresponding to a cross section of the partition walls viewed from the display side. In this case, it is possible to improve a clearness of the image display.

Typical examples of the partition wall forming methods include a screen-printing method, a sandblast method, a photo-conductor paste method and an additive method.

Figure 5:
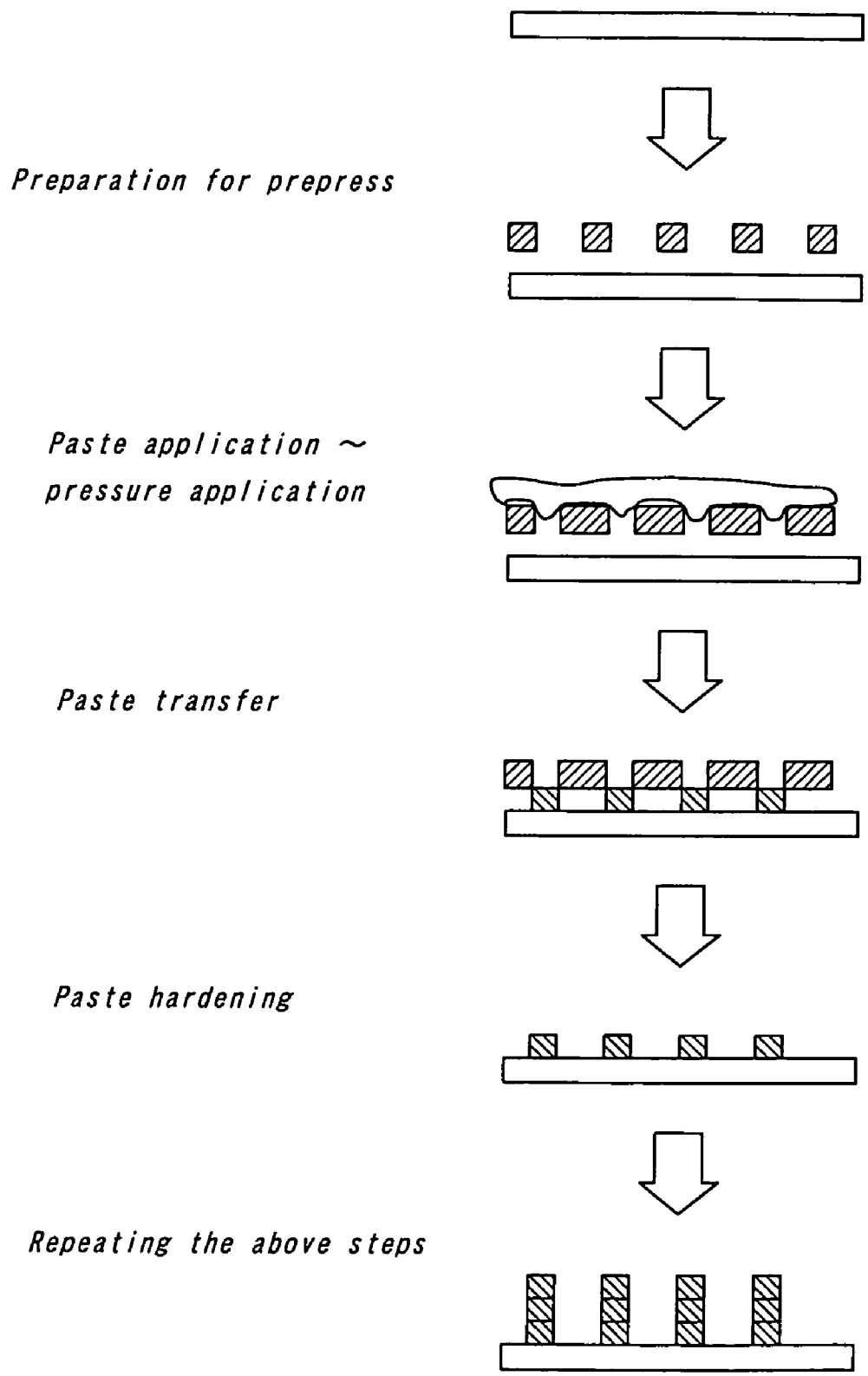
FIG. 5 is a schematic view explaining respective steps when the partition wall is formed by a screen-printing method in the image display device according to the invention.

Specific processes of the screen-printing method shown in FIG. 5 are as follows.

(1) Produce pastes for a material of the partition wall.
(2) Prepare a prepress for printing a pattern of; the partition wall, such as a stainless mess, a polyester mess and so on.
(3) Apply and transfer the pastes through the prepress on one of the substrates (according to need, the substrate on which the electrode pattern mentioned above is formed).
(4) Harden the pastes on the substrate by heating.
(5) Repeat (3)-(4) steps until a predetermined thickness (corresponding to a height of the partition wall) and produce a predetermined partition wall shape.

Here, as the prepress, use may be made of any means even if a predetermined partition wall pattern can be printed, and, for example, use may be made of a plated mesh for securing a high tension, a metal mesh made of a high tension material and so on, a chemical fiber mesh such as a polyester mesh, a tetoron® mesh and so on, and, a combination type mesh wherein polyester mesh is arranged between the prepress and an printing area.

In the screen printer wherein the pastes are transferred on the substrate by means of a squeegee and a scraper through the prepress mentioned above.

In this case, it is preferred to set an attack angle of the squeegee to 10-30 degrees more preferably 15-25 degrees, and to set an application pressure of the squeegee to 0.1-10 kg/cm$^2$, more preferably 0.5-3 kg/cm$^2$.

Figure 6:
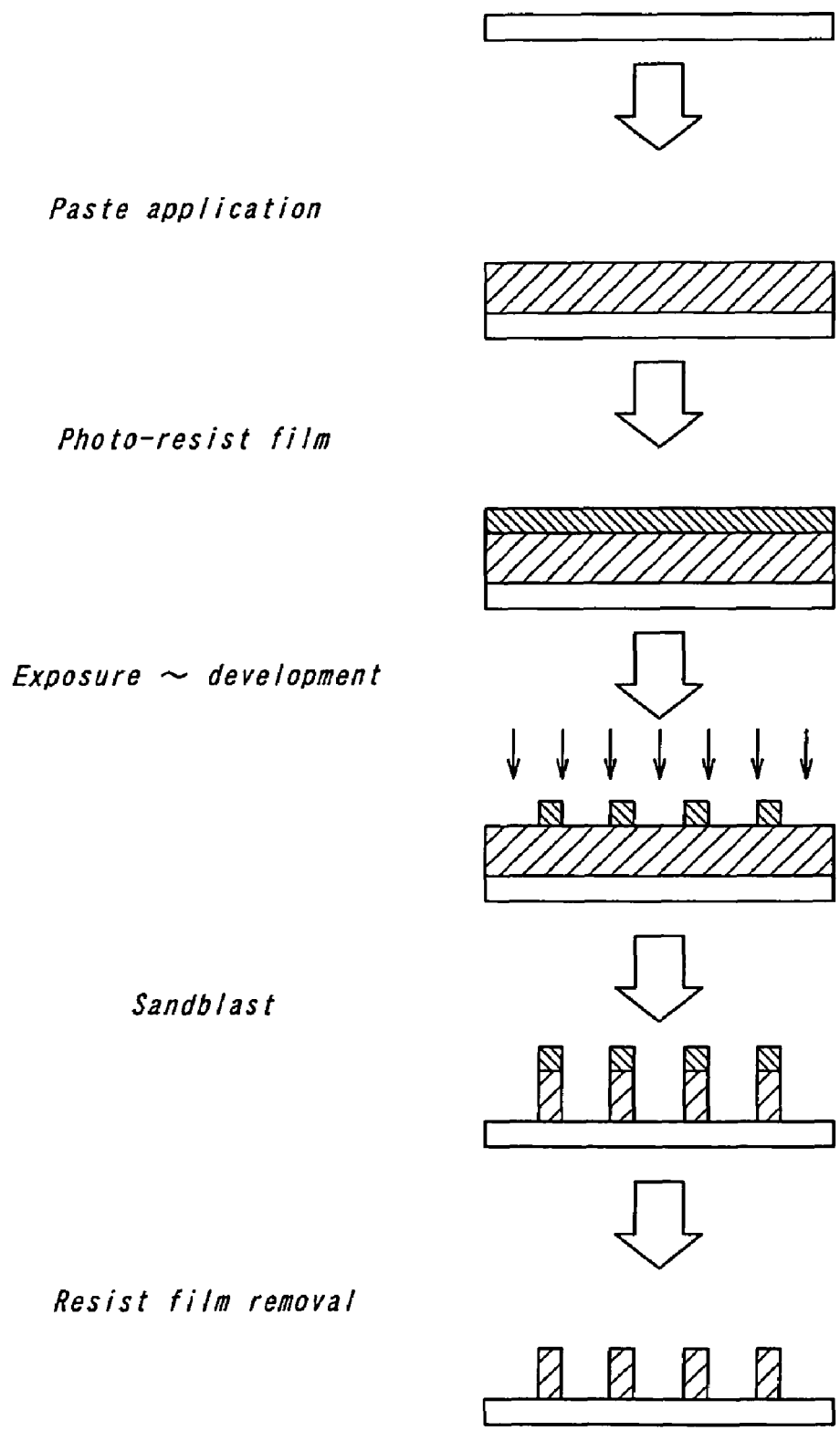
FIG. 6 is a schematic view explaining respective steps when the partition wall is formed by a sandblast method in the image display device according to the invention.

Specific processes of the sandblast method shown in FIG. 6 are as follows (1) Produce pastes for a material of the partition wall.
(2) Apply the pastes on one of the substrates (according to need, the substrate on which the electrode pattern mentioned above is formed), and dry and harden the pastes.
(3) Adhere a photo-resist dry film on the pastes.
(4) Expose and etch the pastes to obtain a remaining pattern portion that becomes the partition wall.
(5) Etch the remaining pattern portion, from which the photo-resist is removed, by a sandblast to obtain a predetermined rib shape.

Here, in the sandblast method, it should be noted that polishing agents are controlled to be discharged straight from a nozzle of a sandblast apparatus by adjusting a balance between an air pressure applied to the polishing agents and a discharge amount of the polishing agents. Hereby, since a spreading of unnecessary polishing agents can be reduced and especially a generation of a side edge of the partition wall can be reduced, the partition wall having an excellent finishing shape can be obtained.

As the polishing agents used for the sandblast, use is made of glass beads, talc, calcium carbonate, metal powders and so on.

Figure 7:
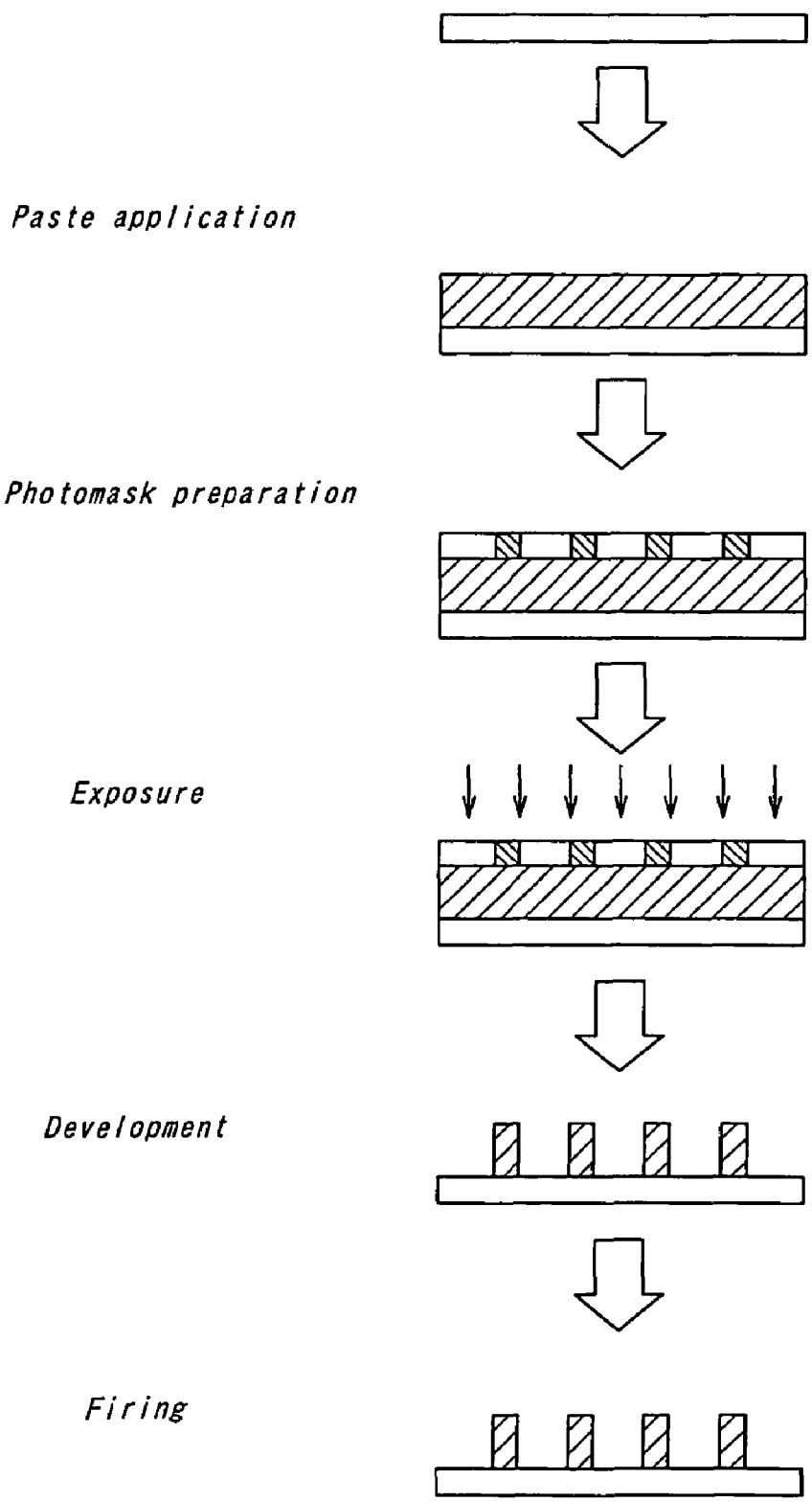
FIG. 7 is a schematic view explaining respective steps when the partition wall is formed by a photo-conductor paste method in the image display device according to the invention.

Specific processes of the photo-conductor paste method shown in FIG. 7 are as follows.

(1) Produce photosensitive pastes including photosensitive resin.
(2) Apply the photosensitive pastes on one of the substrates (according to need, the substrate on which the electrode pattern mentioned above is formed).
(3) Expose the photosensitive pastes at a portion corresponding only to the partition wall by means of a photo-mask and harden the photosensitive pastes (according to need, repeat the steps (2) and (3) until the partition wall has a predetermined height).
(4) Remove non-harden portion of the photosensitive resin by a development.
(5) Fire the harden portion of the photosensitive pastes according to need.

Here, the harden portion of the photosensitive pastes include at least inorganic powder, photosensitive resin, photo-initiator and further consist of solvent, resin and additives.

Figure 8:
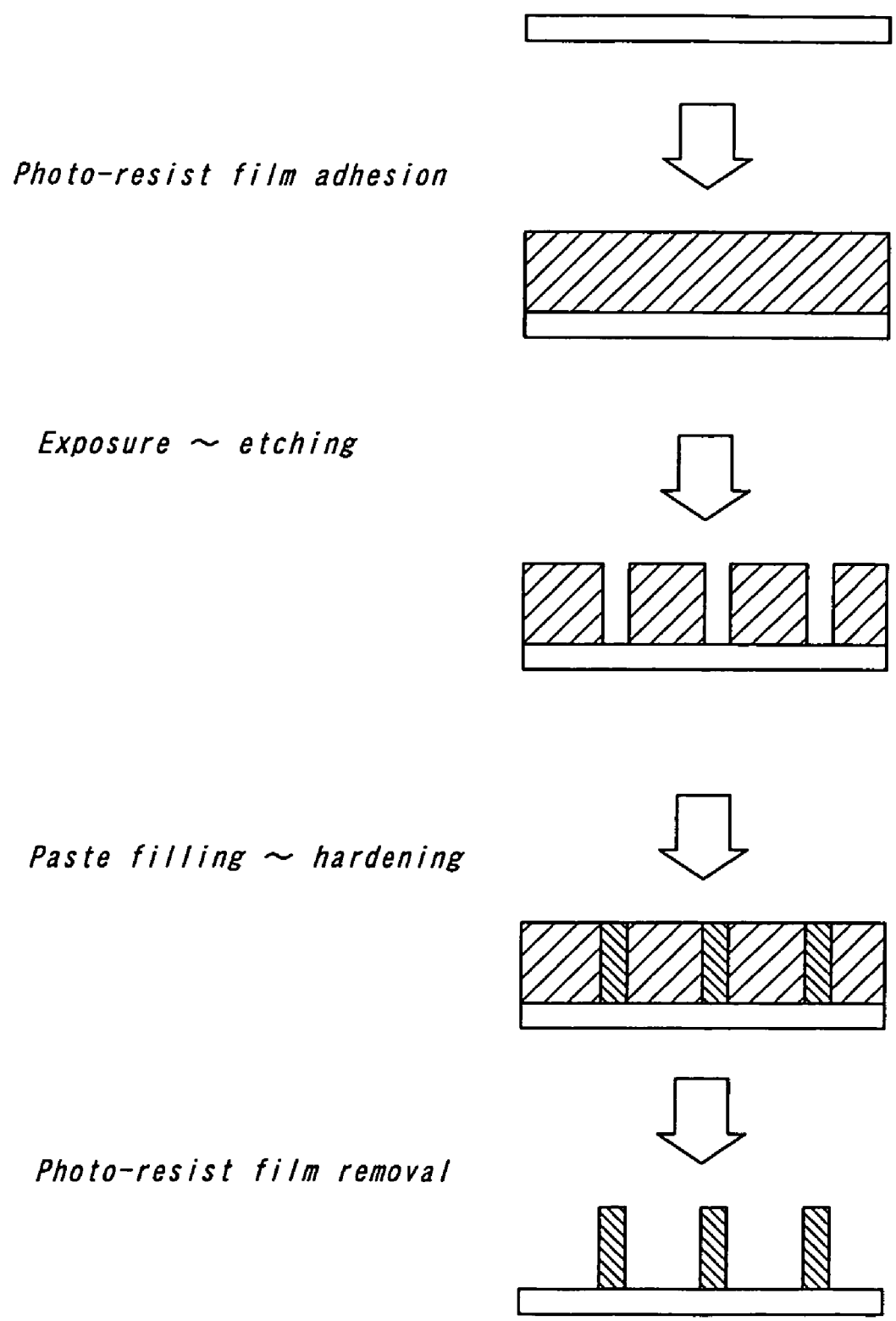
FIG. 8 is a schematic view explaining respective steps when the partition wall is formed by an additive method in the image display device according to the invention.

Specific processes of the additive method shown in FIG. 8 are as follows.

(1) Adhere a photo-resist film on the substrate.
(2) Leave the photo-resist film only at a portion between the partition walls to be formed by means of exposing and etching.
(3) Filling pastes to be the partition wall into a space between the photo-resist film and harden the pastes.
(4) Remove the photo-resist film to form a partition wall having a predetermined shape.

The pastes for the partition wall include at least inorganic powder and resin, and consist of solvent, additives and so on. As the inorganic powder, use is made of ceramic powder, glass powder or a combination of one or more kinds of them.

Typical ceramic powder includes ceramic oxides such as $ZrO_2$, $Al_2O_3$, $CuO$, $MgO$, $TiO_2$, $ZnO$ and so on, and ceramic non-oxides such as $SiC$, $AlN$, $Si_3O_4$ and so on.

Typical glass powder includes a substance obtained by melting raw materials having $SiO_2$, $Al_2O_3$, $B_2O_3$, $Bi_2O_3$, $ZnO$ and so on, and cooling and grinding the melted raw materials. In this case, it is preferred that a glass transition point Tg is 300-500° C. In this glass transition temperature range, since the firing step can be performed at a relatively low temperature, there is a merit that a resin damage is small.

In the pastes for the partition wall, it is preferred that a particle size distribution Span of the particle material constituting the liquid powder, which is defined by the following formula, is not more than 8 more preferably not more than 5:

$$\mathrm{Span}=(d(0.9)-d(0.1))/d(0.5);$$

(here, d(0.5) means a value of the particle size expressed by μm wherein an amount of the particle material constituting the liquid powder having the particle size larger than this value is 50% and an amount of the particle material constituting the liquid powder having the particle size expressed by μm wherein an amount of the particle material constituting the liquid powder having a particle size smaller than this value is 10%, and d(0.9) means a value of the particle size expressed by μm wherein an amount of the particle material constituting the liquid powder having the particle size smaller than this value is 90%).

By setting a value of Span to not more than 8, it is possible make a size of the inorganic powder in the pastes even. Therefore, if the processes of application to hardening for the pastes are repeated to make a lamination, it is possible to form accurately the partition wall.

Moreover, it is preferred that the average particle size d(0.5) of the inorganic powder in the pastes is 0.1-20 μm more preferably 0.3-10 μm. By doing so, it is also possible to form accurately the partition wall if the above processes are repeated to make a lamination.

Here, the particle size distribution and the particle size mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle size, and thus it is possible to measure the particle size and the particle size distribution.

In the present invention, it is defined that the particle size and the particle size distribution are obtained by a volume standard distribution. Specifically, the particle size and the particle size distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The resin included in the pastes for the partition wall can include the inorganic powder mentioned above if a predetermined partition wall can be formed. Typical examples of such a resin are thermoplastic resin, heat-hardening resin, and reactive resin. If required solid state properties of the partition wall are considered, it is preferred to use a resin having a high molecular weight and a high glass transition point Tg. For example, it is preferred to use resins of acrylic-series, styrene-series, epoxy-series, urethane-series, polyester-series, and urea-series and it is especially preferred to use the resins of acrylic-series, epoxy-series, urethane-series, and polyester-series.

As the solvent added in the pastes for the partition wall, use is made of any solvent if it can dissolve the inorganic powder and the resin mentioned above. Typical examples of such a solvent are aromatic solvents such as ester phthalate, toluene, xylene, benzene; alcoholic solvents such as oxy-alcohol, hexanol, octanol; and ester solvents such as ester acetate and so on. Normally, 0.1-50 weight parts of the solvent is added to the inorganic powder.

In addition, according to need, it is possible to add dye, polymerization prevention agents, plasticizer, gum, dispersant, oxidation inhibitor, hardening agents, hardening accelerator, and sedimentation prevention agents.

The paste materials mentioned above are dispersed and mixed at a predetermined composition by means of kneader, agitator, or three rollers. If taking into consideration of workability, it is preferred to set a viscosity to 500-300000 cps (500-300000 mPas).

In the image display device (second aspect) of the invention, the porous spacer is arranged between the opposed substrates and the liquid powder is filled in a space between the opposed substrates.

Here, the porous spacer means a sheet wherein a plurality of holes are opened. It is preferred to use an elastic material as the porous spacer, and for example use may be made of polyurethane, polyester, polyethylene, silicone, natural rubber, synthetic rubber and so on. Moreover, typical method of forming the holes are mechanical methods such as punching and so on; chemical methods such as etching for photosensitive sheet and so on; and optical methods such as laser working and so on.

In this case, it is important to make different a pore size at a display side and a pore size at a none display side, for example, in such a manner that (pore size at display side)/(pore size at none display side) is larger than 1.1 preferably in a range of 1.2-3. By adjusting the pore sizes of the porous spacer as mentioned above, it is possible to improve a durability and to form the holes stably. Here, the reason for improving a durability is not certain, but it is estimated as follows. That is, since an angle is added to a surface of the holes, the liquid powder clashes to a cross section (side surface) in the case of a repeated movement even if the liquid powders with antipolarity with each other are agglutinated. Therefore, the agglutinated liquid powders with antipolarity are scattered and thus its durability is improved.

It is suitable to set a thickness of the porous spacer to 5-500 µm preferably 5-100 µm. By doing so, it is possible to obtain a merit on its property of low voltage drive and also a merit on manufacturing process of excellent spacer arrangement.

Moreover, it is preferred that a hot melt adhesive is arranged on an outer portion of the porous spacer. By doing so, it is possible to further improve a merit on manufacturing process.

Further, it is suitable to set an open rate at a display side of the porous spacer to 40-95% preferably 50-85%. If the open rate is smaller than that range, actual display area becomes small. On the other hand, if the open rate is larger than that range, the actual display area becomes large, but a strength of the porous spacer itself fails. Therefore, it is difficult to maintain an interval between the substrates in a precise manner.

Then, the liquid powder will be explained.

As mentioned above, the liquid powder is an intermediate material having both of liquid properties and particle properties an exhibiting a self-fluidity without utilizing gas force and liquid force.

The liquid powder becomes particularly an aerosol state, and thus, in the image display device according to the invention, it is utilized under such a condition that a solid material is floated in a gas as a dispersant in a relatively stable manner.

As the aerosol state, it is preferred that an apparent volume in a maximum floating state is two times or more than that in none floating state, more preferably 2.5 times or more than that in none floating state, and most preferably three times or more than that in none floating state. In this case, an upper limit is not defined, but it is preferred that an apparent volume is 12 times or smaller than that in none floating state.

If the apparent volume in the maximum floating state is smaller than two times, a display controlling becomes difficult. On the other hand, if the apparent volume in the maximum floating state is larger than 12 times, a handling inconvenience during a liquid powder filling operation into the device such as a particle over-scattering occurs.

Here, the apparent volume in the maximum floating state is measured as follows. That is, it is measured by filling the liquid powder in a transparent closed vessel through which the liquid powder is seen; vibrating or dropping the vessel itself to obtain a maximum floating state; and measuring an apparent volume at that time from outside of the vessel. Specifically, the liquid powder having a volume ⅕ of the vessel is filled as the liquid powder in a vessel with a polypropylene cap having a diameter (inner diameter) of 6 cm and a height of 10 cm (product name I-boy® produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, in the image display device according to the invention, it is preferred that a time change of the apparent volume of the liquid powder satisfies the floating formula:

$$V_{10}/V_5 > 0.8;$$

here, $V_5$ indicates the apparent volume ($cm^3$) of the liquid powder after 5 minutes from the maximum floating state; and $V_{10}$ indicates the apparent volume ($cm^3$) of the liquid powder after 10 minutes from the maximum floating state. In this case, in the image display device according to the invention, it is preferred to set the time change $V_{10}/V_5$ of the apparent volume of the liquid powder to larger than 0.85, more preferably larger than 0.9, most preferably larger than 0.95. If the time change $V_{10}/V_5$ is not larger than 0.8, the liquid powder is substantially equal to normal particles, and thus it is not possible to maintain a high speed response and durability according to the invention.

Moreover, it is preferred that the average particle size d(0.5) of the particle materials constituting the liquid powder is 0.1-20 μm, more preferably 0.5-15 μm, most preferably 0.9-8 μm. If the average particle size d(0.5) is less than 0.1 μm, a display controlling becomes difficult. On the other hand, if the average particle size d(0.5) is larger than 20 μm, a display is possible, but opacifying power is decreased and thus a thin shape device is difficult.

Here, the average particle size d(0.5) of the particle materials constituting the liquid powder is equal to d(0.5) in the following particle size distribution Span.

It is preferred that particle size distribution Span of the particle material constituting the liquid powder, which is defined by the following formula, is not more than 5 preferably not more than 3:

$$\text{Span}=(d(0.9)-d(0.1))/d(0.5);$$

here, d(0.5) means a value of the particle size expressed by μm wherein an amount of the particle material constituting the liquid powder having the particle size larger than this value is 50% and an amount of the particle material constituting the liquid powder having the particle size expressed by μm wherein an amount of the particle material constituting the liquid powder having a particle size smaller than this value is 10%, and d(0.9) means a value of the particle size expressed by μm wherein an amount of the particle material constituting the liquid powder having the particle size smaller than this value is 90%.

If the particle size distribution Span of the particle materials constituting the liquid powder is set to not more than 5, the particle size becomes even and it is possible to perform an even liquid powder movement.

Here, the particle size distribution and the particle size mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle size, and thus it is possible to measure the particle size and the particle size distribution.

In the present invention, it is defined that the particle size and the particle size distribution are obtained by a volume standard distribution. Specifically, the particle size and the particle size distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powder may be formed by mixing necessary resin, charge control agent, coloring agent, additive and so on and grinding them, or, by polymerizing from monomer, or, by coating a particle with resin, charge control agent, coloring agent, and additive and so on.

Hereinafter, typical examples of resin, charge control agent, coloring agent, additive and so on constituting the liquid powder will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers.

Examples of the electric charge control agent include, positive charge control agent include the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of basic or acidic dye may be employable. Examples include Nigrosine, Methylene Blue, quinoline yellow, rose bengal and do on.

Examples of the inorganic additives include titanium oxide, Chinese white, zinc sulfide, antimonial oxide, calcium carbonate, zinc white, talc, silica, calcium silicate, alumina white, cadmium yellow, cadmium red, cadmium orange, titanium yellow, iron blue, ultramarine blue, cobalt blue, cobalt green, cobalt violet, ferric oxide, carbon black, copper powder, aluminum powder and so on.

However, if the above materials are only mixed or coated with no contrivance, the liquid powder exhibiting an aerosol state cannot be obtained. The regular method of forming the liquid powder exhibiting an aerosol state is not defined, but the following method is preferably used.

At first, inorganic fine particles having an average particle size of 20-100 nm preferably 20-80 nm are preferably fixed on a surface of materials constituting the liquid powder. Moreover, it is preferred to treat the inorganic fine particles by a silicone oil.

Here, as for the inorganic fine particles, use may be made of silicon dioxide (silica), zinc oxide, aluminum oxide, magnesium oxide, cerium oxide, ferric oxide, copper oxide and so on. In this case, a method of coating is important. For example, use may be made of CRUX system (Hosokawa Micron Co., Ltd.) wherein water or organic solvent in which particles and resins are dispersed is heated to a temperature over a boiling point of the dispersant, a resin coating is performed by passing the heated dispersant through a micro tube under a reduction pressure.

As a still another manufacturing method, there is a method of treating a surface of the particles constituting the liquid powder by hexamethyl-silazan, fluorine coupling agents, silicon coupling agents and so on.

Here, in order to further improve a repeating durability, it is effective to control a stability of the resin constituting the liquid powder, especially, a water absorbing rate and a solvent insoluble rate.

It is preferred that the water absorbing rate of the resin constituting the liquid powder sealed between the substrates is not more than 3 wt % especially not more than 2 wt %. In this case, a measurement of the water absorbing rate is performed according to ASTM-D570 and a measuring condition is 23° C. for 24 hours.

As for the solvent insoluble rate of the liquid powder, it is preferred that a solvent insoluble rate of the liquid powder, which is defined by the following formula, is not less than 50% more preferably not less than 70%:

$$\text{solvent insoluble rate }(\%)=(B/A)\times 100;$$

(here, A is a weight of the liquid powder before being immersed into the solvent and B is a weight of resin components after the liquid powder is immersed into good solvent at 25° C. for 24 hours).

If the solvent insoluble rate is less than 50%, a bleed is generated on a surface of the particle material constituting the liquid powder when maintaining for a long time. In this case, it affects an adhesion power with the liquid powder and prevent a movement of the liquid powder. Therefore, there is a case such that it affects a durability of the image display.

Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

As for a filling amount of the liquid powder, it is preferred to control an occupied volume (volume occupied rate) of the liquid powder to 10-80 vol %, more preferably 10-65 vol %, most preferably 10-55 vol % of a space between the opposed substrates. In this case, if the volume occupied rate is less than 10 vol %, a clear image display is not performed. On the other hand, if the volume occupied rate is larger than 80 vol %, the liquid powder is difficult to move.

Further, in the present invention, it is important to control a gas in a gap surrounding the liquid powder between the substrates, and a suitable gas control contributes an improvement of a display stability. Specifically, it is important to control a humidity of the gap gas to not more than 60% RH at 25° C., preferably not more than 50% RH, more preferably not more than 35% RH.

The above gap means a gas portion surrounding the liquid powder obtained by substituting an occupied portion of the liquid powder 3, an occupied portion of the partition wall 4 and a seal portion of the device from the space between the opposed substrates 1 and 2.

A kind of the gap gas is not limited if it has the humidity mentioned above, but it is preferred to use dry air, dry nitrogen gas, dry helium gas, dry carbon dioxide gas, dry methane gas and so on.

It is necessary to seal this gas in the device so as to maintain the humidity mentioned above. For example, it is important to perform the operations of filling the liquid powder and assembling the substrate under an atmosphere having a predetermined humidity and to apply a seal member and a seal method for preventing a humidity inclusion from outside of the device.

In order to obtain the liquid powder exhibiting an aerosol state, it is difficult to use a normal filling method for filling the liquid powder in the display device. In this case, it is preferred to use an electrostatic plating apparatus and to adhere the liquid powder to the substrate by force so as to perform an easy handling. In addition, the liquid powder may be adhered to one substrates or may be adhered to both of the substrates, and then the substrates are connected.

The image display device according to the invention is applicable to the image display unit for mobile equipment such as notebook personal computers, PDAs, cellular phones and so on; to the electric paper for electric book, electric newspaper and so on; to the bulletin boards such as signboards, posters, blackboards and so on; to the rewritable paper substituted for a paper of copy machine, printer and so on; and to the image display unit for electric calculator, home electric application products, auto supplies and so on.

Hereinafter, the present invention will be explained in detail with reference to examples and comparative examples. However, the present invention is not limited to the following example.

In the following examples and comparative examples, estimations of the solid state properties and the functions of the display device are performed according to the standard mentioned below.

(1) As to average particle size and particle size distribution Span of the particle material constituting the liquid powder:

The particle size and the particle size distribution were measured by means of a measuring apparatus Mastersizer 2000 (Malvern Instruments Ltd.) wherein the particles setting therein are calculated by an installed analysis software (which is based on a volume standard distribution due to Mie's theory) on the basis of the following formula.

particle size distribution (μm): Span=$(d(0.9)-d(0.1))/d(0.5)$;

(here, d(0.5) means a value of the particle size expressed by μm wherein an amount of the particle material constituting the liquid powder having the particle size larger than this value is 50% and an amount of the particle material constituting the liquid powder having the particle size expressed by μm wherein an amount of the particle material constituting the liquid powder having a particle size smaller than this value is 10%, and d(0.9) means a value of the particle size expressed by μm wherein an amount of the particle material constituting the liquid powder having the particle size smaller than this value is 90%).

The average particle size (μm) is the above d(0.5).

(2) As to apparent volume in maximum floating state of liquid powder/apparent volume in none floating state of liquid powder ($V_{max}/v_0$):

It was measured according to the method mentioned above.

(3) As to time change of apparent volume of liquid powder ($V_{10}/V_5$):

According to the method mentioned above, the apparent volume of the liquid powder after 5 minutes from the maximum floating state $V_5$ (cm³) and the apparent volume of the liquid powder after 10 minutes from the maximum floating state $V_{10}$ (cm³) were measured.

(4) As to solvent insoluble rate of liquid powder:

The liquid powder was immersed in methyl ethyl ketone solvent at 25° C. for 24 hours, and the weight after drying at 100° C. for 5 hours was measured. From the weight change before and after immersing, the solvent insoluble rate was measured according to the following formula.

solvent insoluble rate (%)=$(B/A)\times 100$;

(here, A is a weight of the liquid powder before being immersed into the solvent and B is a weight after the liquid powder is immersed into methyl ethyl ketone solvent at 25° C. for 24 hours and dried at 100° C. for 5 hours).

(5) As to repose angle of liquid powder or powder:

Respective powders were set in Powder Test PT-R (Hosokawa Micron Co., Ltd.), and the repose angle was measured.

Figure 9:
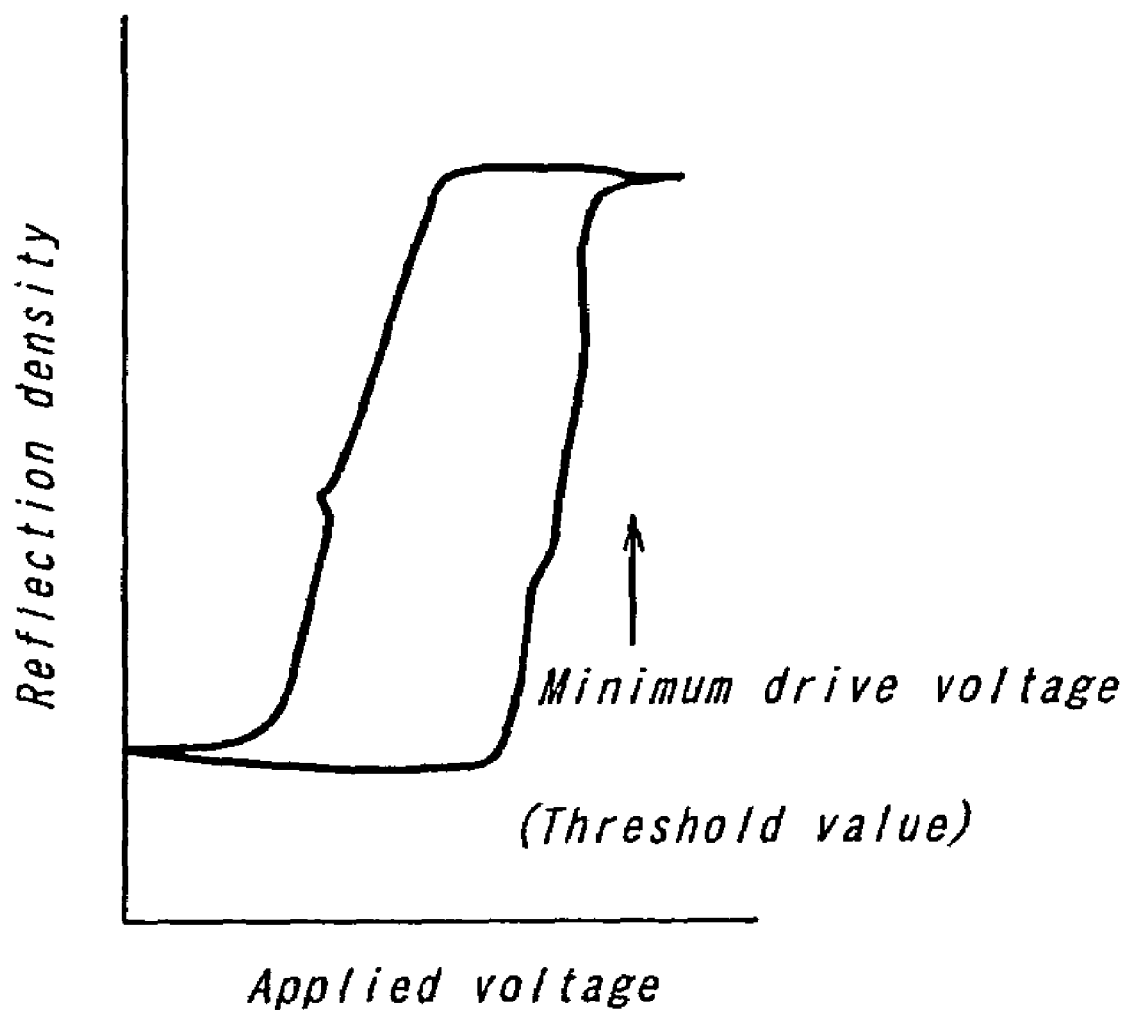
FIG. 9 is a graph explaining a relation between an applied voltage and a reflection density in an estimation of display function of the image display device according to the invention.

(6) As to estimation of display functions of display device:

The voltage applied to display device was increased, and the voltage, at which the display becomes capable by the movement of the liquid powder or the powder, was measured as a minimum drive voltage. Specifically, as shown in FIG. 9, a threshold voltage was defined as the minimum drive voltage.

Then, a voltage of the minimum drive voltage +10V was applied, and a display of black color—white color (or yellow color) was repeated by inverting its potential.

The estimation of the display function was performed in such a manner that contrast ratios at initial point, after 20000 times (first aspect of the invention) or 10000 times (second aspect of the invention), and after 5 days left, were measured. Here, the contrast ratio was defined by reflection density at black display/reflection density at white (or yellow) display. For reference, a maintaining rate was defined as a ration of the contrast ratios after 20000 times, 10000 times or 5 days with respect to the initial contrast ratio.

Further, in the second aspect of the invention, as one index of durability estimation, it was estimated whether the colony (agglutination) is generated or not. In this case, other than the display driven by the applied voltage, it was estimated by naked eyes (size measurement) whether the colony (agglutination) having a particle size over 500 μm which does not respond to the applied voltage is generated or not.

Moreover, the response speed was measured from the output value deviation by using photomultiplier.

Herein after, examples 1-12 and comparative examples 1-3 according to the first aspect of the invention, and examples 21-27 and comparative examples 11, 12 according to the second aspect of the invention will be explained.

EXAMPLE 1

(Production of Liquid Powder)

Two kinds of the liquid powders (liquid powder X, liquid powder Y) were prepared.

The liquid powder X was produced as follows. At first, methyl methacrylate monomer, $TiO_2$ (20 phr), charge control agent bontron E89 (Orient Chemical Industries, Ltd.: 5 phr), initiator AIBN (0.5 phr) were suspended and polymerized. After that, particle sizes of the polymerized particles were graded by using a grading device. Then, by using hybridizer (Nara Machinery Co., Ltd.), the polymerized particles, external additive A (silica H2000, Wacker Ltd.) and external additive B (silica SS20, Japan Silica Ltd.) were set therein and treated at 4800 rpm for 5 minuets, so that the external additives were fixed on a surface of the polymerized particles to obtain the liquid powder.

The liquid powder Y was produced as follows. At first, styrene monomer, azo compounds (5 phr), charge control agent bontron N07 (Orient Chemical Industries, Ltd.: 5 phr), initiator AIBN (0.5 phr) were suspended and polymerized. After that, particle sizes of the polymerized particles were graded by using a grading device. Then, by using hybridizer (Nara Machinery Co., Ltd.), the polymerized particles, external additive C (silica H2050, Wacker Ltd.) and external additive B (silica SS20, Japan Silica Ltd.) were set therein and treated at 4800 rpm for 5 minuets, so that the external additives were fixed on a surface of the polymerized particles to obtain the liquid powder.

The solid state properties of the liquid powder X and the liquid powder Y i.e. the above mentioned (1) average particle size and particle size distribution of the liquid powder, (2) ratio of apparent volume at maximum floating state of the liquid powder and apparent volume at none floating state, (3) time change of the apparent volume of the liquid powder ($V_{10}/V_5$), (4) solvent insoluble rate of the liquid powder and (5) repose angle of the liquid powder and the powder were shown in table 1.

(Production of Display Device Used in Embodiment)

At first, a substrate with an electrode, to which the following partition wall was formed, was produced.

On a glass substrate to which indium oxide having a thickness of about 500 Å was arranged, a rib having a height of 250 μm was produced to form a partition wall having a stripe shape and a single lever construction.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having heat hardening property was prepared. Then, the glass powder and the epoxy resin were mixed with a solvent and controlled to be a viscosity of 15000 cps, so that a paste was produced.

Then, the paste was applied on a substrate and heated at 150° C. to be hardened. By repeating the above paste applying and heating steps, a thickness (corresponding to a height of the partition wall) was controlled to be 200 μm.

Then, a dry photo-resist was adhered. With respect to the adhered dry photo-resist, an exposing step and an etching step were performed so as to form a mask by which a partition wall pattern having a line of 50 μm, a space of 200 μm and a pitch of 250 μm can be formed.

Then, unnecessary portions were removed by a sandblast to form a predetermined partition wall having a stripe shape.

The liquid powder X was tentatively adhered to the glass substrate on which the indium oxide electrode is arranged by means of the electrostatic coating machine, and the liquid powder Y was tentatively adhered to another glass substrate. Then, the glass substrates were opposed with a spacing of 120 μm by using the spacer, and a periphery of the glass substrate is connected by means of epoxy adhesive agent, so that the display device, in which the liquid powder is sealed, was produced. The mixing ratio of the liquid powder X and the liquid powder Y was controlled to be even, and the filling rate of the liquid powder between the glass substrates was controlled to be 30 vol % as the volume occupied rate. Here, the gas surrounding the liquid powder in the gap between the substrates was an air having a relative humidity of 35% RH.

The estimation results of the display function in the display device were shown in the following Table 1.

EXAMPLE 2

The display device was produced in the same manner as that of the example 1, except that main materials of the liquid powder X and the liquid powder Y are urethane (in the liquid powder Y, it was used together with carbon).

The solid state properties of the liquid powder X and the liquid powder Y and the estimation results of the display function in the display device were shown in the following Table 1.

EXAMPLE 3

The display device was produced in the same manner as that of the example 1, except that an addition amount of the initiator AIBN of the liquid powder X and the liquid powder Y are changed to 0.1 phr.

The solid state properties of the liquid powder X and the liquid powder Y and the estimation results of the display function in the display device were shown in the following Table 1. In this case, since an addition amount of the initiator AIBN was decreased, the solvent insoluble rate was decreased, and the stability after some time left was slightly deteriorated.

EXAMPLE 4

The display device was produced in the same manner as that of the example 1, except that the grading after suspending and polymerizing operation of the liquid powder X and the liquid powder Y is not performed.

The solid state properties of the liquid powder X and the liquid powder Y and the estimation results of the display function in the display device were shown in the following Table 1. In this case, since the grading was not performed, the particle size distribution Span was increased, and the durability was slightly deteriorated.

EXAMPLE 5

The display device was produced in the same manner as that of the example 1, except that the humidity of the air surrounding the liquid powder in the gap between the substrates was changed to 80% RH.

The solid state properties of the liquid powder X and the liquid powder Y and the estimation results of the display function in the display device were shown in the following Table 1. In this case, since the humidity of the air in the gap was high, the durability was slightly deteriorated.

EXAMPLE 6

The display device was produced in the same manner as that of the example 1, except that the partition wall was not arranged. The solid state properties of the liquid powder X and the liquid powder Y and the estimation results of the display function in the display device were shown in the following Table 1. In this case, since the partition wall was not arranged, the durability was slightly deteriorated.

EXAMPLE 7

The liquid powder X was produced in such a manner that acrylic urethane resin EAU65B (Asia-Kogyo Co., Ltd.) was coated on spherical fine particle of white polymethyl methacrylate MX-500 (Soken Chemical & Engineering Co., Ltd.: average particle size of 5.1 μm) by using agglomaster MINI (Hosakawa Micron Co., Ltd.).

The coating by using agglomaster MINI was performed by setting the fine particles of 150 g in a treatment vessel maintained at 80° C., rotating at 600 rpm by using an agitating blade, introducing a compressed air having a temperature of 80° C. from a bottom portion of the treatment vessel and agitating the particles. Then, resin and cross-linking agent were dissolved in methyl ethyl ketone solvent, and then it is sprayed for about 30 minutes by means of a spray nozzle.

The liquid powder Y was produced in such a manner that fluoro-carbon resin KYNAR 2751 (Elf-Atochem-Japan Co., Ltd.) was coated on spherical fine particles of black polymethyl methacrylate CMX-500 (Soken Chemical & Engineering Co., Ltd.: average particle size of 5.1 μm) by using agglomastaer MINI (Hosakawa Micron Co., Ltd.).

The display device was produced in the same manner as that of the example 1, except that the above liquid powders were used. The solid state properties of the liquid powder X and the liquid powder Y and the estimation results of the display function in the display device were shown in the following Table 2.

EXAMPLE 8

The display device was produced in the same manner as that of the example 7, except that, in the liquid powder X, nylon resin Torejin EF300 (Teikoku Chemical Co., Ltd,) was coated.

The solid state properties of the liquid powder X and the liquid powder Y and the estimation results of the display function in the display device were shown in the following Table 2.

EXAMPLE 9

The liquid powder X was produced in such a manner that fluoro-carbon resin KYNAR 2751 (Elf-Atochem-Japan Co., Ltd.) was coated on spherical fine particles of white styrene SX-500 (Soken Chemical & Engineering Co., Ltd.: average particle size of 5.0 μm) by using CRUX system (Hosokawa Micron Co., Ltd.).

The coating by using CRUX system was performed by dispersing fine particle: 200 g, coating resin: 10 g and cross-linking agent: 1 g in methyl ethyl ketone (boiling point of 79.6° C.): 5 kg to obtain a slurry, and passing the slurry through a tubule having a diameter of 8 mm and a length of 4 m.

The liquid powder Y was produced in such a manner that acrylic urethane resin EAU65B (Asia-Kogyo Co., Ltd.) was coated on spherical fine particle of black polymethyl methacrylate CSX-500 (Soken Chemical & Engineering Co., Ltd.: average particle size of 5.0 μm) by using CRUX system (Hosakawa Micron Co., Ltd.).

The display device was produced in the same manner as that of the example 1, except that the above liquid powders were used.

The solid state properties of the liquid powder X and the liquid powder Y and the estimation results of the display function in the display device were shown in the following Table 2.

EXAMPLE 10

The display device was produced in the same manner as that of the example 9, except that, in the liquid powder Y, nylon resin Torejin EF300 (Teikoku Chemical Co., Ltd,) was coated.

The solid state properties of the liquid powder X and the liquid powder Y and the estimation results of the display function in the display device were shown in the following Table 2.

EXAMPLE 11

The liquid powder X was produced in such a manner that the surface treatment was performed by agitating spherical fine particle of white polymethyl methacrylate MX-500 (Soken Chemical & Engineering Co., Ltd.: average particle size of 5.1 μm): 100 g and dropping hexamethldisilazane: 2 g therein.

The liquid powder Y was produced in such a manner that negatively chargeable charge control agent bontron E84 (Orient Chemical Industries Ltd.): 5 parts by weight and carbon black #85 (Degussa Japan Co., Ltd.): 7 parts by weight were mixed with styrene resin MW-1 (TOYO-STYRENE Co., Ltd.), and it was ground and graded.

The display device was produced in the same manner as that of the example 1, except that the above liquid powders were used.

The solid state properties of the liquid powder X and the liquid powder Y and the estimation results of the display function in the display device were shown in the following Table 2.

EXAMPLE 12

The display device was produced in the same manner as that of the example 11, except that, in the liquid powder X, spherical fine particles of white styrene SX-500 (Soken Chemical & Engineering Co., Ltd.: average particle size of 5.0 μm) was used The solid state properties of the liquid powder X and the liquid powder Y and the estimation results of the display function in the display device were shown in the following Table 2.

COMPARATIVE EXAMPLE 1

The display device was produced in the same manner as that of the example 1, except that, in the manufactures of the liquid powder X and the liquid powder Y, a process condition of the hybridizer was changed to 4800 rpm for 1 minute.

The solid state properties of the liquid powder X and the liquid powder Y and the estimation results of the display function in the display device were shown in the following Table 3. In this case, since the process condition of hybridizer was changed and thus the liquid powder state was deteriorated, the drive voltage became high, the durability was deteriorated and the response speed became slow.

COMPARATIVE EXAMPLE 2

The display device was produced in the same manner as that of the example 1, except that, in the manufactures of the liquid powder X and the liquid powder Y, a process condition of the hybridizer was changed to 4800 rpm for 30 minutes.

The solid state properties of the liquid powder X and the liquid powder Y and the estimation results of the display function in the display device were shown in the following Table 3. In this case, since the process condition of hybridizer was changed and thus the liquid powder state was deteriorated, the drive voltage became high, the durability was deteriorated and the response speed became slow.

COMPARATIVE EXAMPLE 3

The display device was produced in the same manner as that of the example 1, except that, instead of the liquid powder X and the liquid powder Y, use was made of commercially available toner for electrophotography. The solid state properties of the commercially available toner for electrophotography and the estimation results of the display function in the display device were shown in the following Table 3.

From the results, it was understood that the liquid powder state was deteriorated, the drive voltage became high, the durability was deteriorated and the response speed became slow.

TABLE 1

| | | Example 1 | Example 2 | Example 3 |
|---|---|---|---|---|
| Liquid powder X | (Material of liquid powder) | | | |
| | Main material | MMA monomer | urethane | MMA monomer |
| | | $TiO_2$ | $TiO_2$ | $TiO_2$ |
| | Initiator (phr) | AIBN(0.5) | | AIBN(0.1) |
| | Charge control agent | bontron E89 | bontron E89 | bontron E89 |
| | Material of external additive A | silica H2000/4 | silica H2000/4 | silica H2000/4 |
| | Diameter (nm) | 20 | 20 | 20 |
| | Material of external additive B | silica SS20 | silica SS20 | silica SS20 |
| | Diameter (nm) | 25 | 25 | 25 |
| | External additive adhesion state: | hybridizer | hybridizer | hybridizer |
| | processing time of hybridizer (min.) | 5 | 4 | 5 |
| | (Solid state properties of liquid powder) | | | |
| | Particle size (μm) | 3.3 | 5.2 | 4.1 |
| | Distribution of particle size Span | 1.6 | 1.9 | 1.8 |
| | $V_{max}/V_0$ | 3.1 | 2.5 | 2.6 |
| | $V_{10}/V_5$ | 0.91 | 0.88 | 0.87 |
| | Repose angle (°) | measurement incapable | measurement incapable | measurement incapable |
| | Solvent insoluble rate (%) | 92 | 92 | 48 |
| Liquid powder Y | (Material of liquid powder) | | | |
| | Main material | styrene monomer | urethane | styrene monomer |
| | | azo-series compound | carbon | azo-series compound |
| | Initiator (phr) | AIBN(0.5) | | AIBN(0.1) |
| | Charge control agent | bontron N07 | bontron N07 | bontron N07 |
| | Material of external additive C | silica H2050 | silica H2050 | silica H2050 |
| | Diameter (nm) | 20 | 20 | 20 |
| | Material of external additive B | silica SS20 | silica SS20 | silica SS20 |
| | Diameter (nm) | 25 | 25 | 25 |
| | External additive adhesion state: | hybridizer | hybridizer | hybridizer |

TABLE 1-continued

|  |  | | | |
|---|---|---|---|---|
| | processing time of hybridizer (min.) | 5 | 7 | 5 |
| | (Solid state properties of liquid powder) | | | |
| | Particle size (μm) | 3.1 | 5.1 | 4.2 |
| | Distribution of particle size Span | 1.7 | 2.0 | 1.9 |
| | $V_{max}/V_0$ | 3.2 | 2.6 | 2.7 |
| | $V_{10}/V_5$ | 0.92 | 0.88 | 0.88 |
| | Repose angle (°) | measurement incapable | measurement incapable | measurement incapable |
| | Solvent insoluble rate (%) | 92 | 92 | 49 |
| | Relative humidity of gap gas (%) | 35 | 35 | 35 |
| | Partition wall | existence | existence | existence |
| | (Estimation of display function) | | | |
| | Minimum drive voltage (V) | 20 | 23 | 24 |
| | Initial contrast ratio | 9.20 | 7.80 | 9.20 |
| | Contrast ratio after 20000 times | 8.37 | 6.94 | 8.00 |
| | Maintaining rate (%) | 91 | 89 | 87 |
| | Contrast rate after 5 days left | 8.19 | 6.79 | 6.35 |
| | Maintaining rate (%) | 89 | 87 | 69 |
| | Response speed (m/sec) | 0.1 | 0.2 | 0.3 |

|  |  | Example 4 | Example 5 | Example 6 |
|---|---|---|---|---|
| Liquid powder X | (Material of liquid powder) | | | |
| | Main material | MMA monomer TiO$_2$ | MMA monomer TiO$_2$ | MMA monomer TiO$_2$ |
| | Initiator (phr) | AIBN(0.5) | AIBN(0.5) | AIBN(0.5) |
| | Charge control agent | bontron E89 | bontron E89 | bontron E89 |
| | Material of external additive A | silica H2000/4 | silica H2000/4 | silica H2000/4 |
| | Diameter (nm) | 20 | 20 | 20 |
| | Material of external additive B | silica SS20 | silica SS20 | silica SS20 |
| | Diameter (nm) | 25 | 25 | 25 |
| | External additive adhesion state: processing time of hybridizer (min.) | hybridizer 5 | hybridizer 5 | hybridizer 5 |
| | (Solid state properties of liquid powder) | | | |
| | Particle size (μm) | 4.2 | 3.3 | 3.3 |
| | Distribution of particle size Span | 5.1 | 1.6 | 1.6 |
| | $V_{max}/V_0$ | 2.1 | 3.1 | 3.1 |
| | $V_{10}/V_5$ | 0.81 | 0.91 | 0.91 |
| | Repose angle (°) | measurement incapable | measurement incapable | measurement incapable |
| | Solvent insoluble rate (%) | 91 | 92 | 92 |
| Liquid powder Y | (Material of liquid powder) | | | |
| | Main material | styrene monomer azo-series compound | styrene monomer azo-series compound | styrene monomer azo-series compound |
| | Initiator (phr) | AIBN(0.5) | AIBN(0.5) | AIBN(0.5) |
| | Charge control agent | bontron N07 | bontron N07 | bontron N07 |
| | Material of external additive C | silica H2050 | silica H2050 | silica H2050 |
| | Diameter (nm) | 20 | 20 | 20 |
| | Material of external additive B | silica SS20 | silica SS20 | silica SS20 |
| | Diameter (nm) | 25 | 25 | 25 |
| | External additive adhesion state: processing time of hybridizer (min.) | hybridizer 5 | hybridizer 5 | hybridizer 5 |
| | (Solid state properties of liquid powder) | | | |
| | Particle size (μm) | 4.3 | 3.1 | 3.1 |
| | Distribution of particle size Span | 5.2 | 1.7 | 1.7 |
| | $V_{max}/V_0$ | 2.0 | 3.2 | 3.2 |
| | $V_{10}/V_5$ | 0.80 | 0.92 | 0.92 |
| | Repose angle (°) | measurement incapable | measurement incapable | measurement incapable |
| | Solvent insoluble rate (%) | 91 | 92 | 92 |
| | Relative humidity of gap gas (%) | 35 | 35 | 80 |
| | Partition wall | existence | existence | existence |

TABLE 1-continued

| (Estimation of display function) | | | |
|---|---|---|---|
| Minimum drive voltage (V) | 42 | 38 | 21 |
| Initial contrast ratio | 9.00 | 8.80 | 9.20 |
| Contrast ratio after 20000 times | 7.38 | 7.04 | 7.73 |
| Maintaining rate (%) | 82 | 80 | 84 |
| Contrast rate after 5 days left | 7.20 | 6.07 | 7.36 |
| Maintaining rate (%) | 70 | 69 | 80 |
| Response speed (m/sec) | 1.1 | 2.1 | 0.2 |

TABLE 2

| | | Example 7 | Example 8 | Example 9 |
|---|---|---|---|---|
| Liquid powder X | Main material | MX-500 | MX-500 | SX-500 |
| | Coating resin material | EAU65B | EF300 | KYNAR-2751 |
| | Processing agent | — | — | — |
| | Coating process state | AGLOMASTER MINI | AGLOMASTER MINI | — |
| | | — | — | CRUX-system |
| | (Solid state properties of liquid powder) | | | |
| | Particle size (μm) | 5.1 | 5.1 | 5.0 |
| | Distribution of particle size Span | 0.7 | 0.7 | 0.6 |
| | $V_{max}/V_0$ | 3.1 | 3.0 | 2.9 |
| | $V_{10}/V_5$ | 0.92 | 0.92 | 0.90 |
| | Repose angle (°) | measurement incapable | measurement incapable | measurement incapable |
| | Solvent insoluble rate (%) | 95 | 95 | 92 |
| Liquid powder Y | Main material | CMX-500 | CMX-500 | CSX-500 |
| | Coating resin material | KYNAR-2751 | KYNAR-2751 | EAU65B |
| | Processing agent | — | — | — |
| | Charge control agent | — | — | — |
| | Coating process state | AGLOMASTER MINI | AGLOMASTER MINI | — |
| | | — | — | CRUX-system |
| | (Solid state properties of liquid powder) | | | |
| | Particle size (nm) | 5.1 | 5.1 | 5.0 |
| | Distribution of particle size Span | 0.7 | 0.7 | 0.6 |
| | $V_{max}/V_0$ | 3.2 | 3.1 | 3.0 |
| | $V_{10}/V_5$ | 0.94 | 0.94 | 0.91 |
| | Repose angle (°) | measurement incapable | measurement incapable | measurement incapable |
| | Solvent insoluble rate (%) | 95 | 95 | 92 |
| | Relative humidity of gap gas (%) | 35 | 35 | 35 |
| | Partition wall | existence | existence | existence |
| (Estimation of display function) | | | | |
| | Minimum drive voltage (V) | 30 | 32 | 30 |
| | Initial contrast ratio | 7.3 | 7.4 | 7.3 |
| | Contrast ratio after 20000 times | 6.5 | 6.6 | 6.6 |
| | Maintaining rate (%) | 89 | 89 | 90 |
| | Contrast rate after 5 days left | 6.4 | 6.4 | 6.6 |
| | Maintaining rate (%) | 87 | 86 | 88 |
| | Response speed (m/sec) | 0.2 | 0.2 | 0.2 |
| | | Example 10 | Example 11 | Example 12 |
| Liquid powder X | Main material | SX-500 | MX-500 | SX-500 |
| | Coating resin material | KYNAR-2751 | — | — |
| | Processing agent | — | Hexamethyl-disilazane | Hexamethyl-disilazame |
| | Coating process state | — | — | — |
| | | CRUX-system | — | — |
| | (Solid state properties of liquid powder) | | | |
| | Particle size (μm) | 5.0 | 5.1 | 5.0 |
| | Distribution of particle size Span | 0.6 | 0.7 | 0.6 |

TABLE 2-continued

|  |  |  |  |  |
|---|---|---|---|---|
|  | $V_{max}/V_0$ | 3.0 | 3.2 | 3.1 |
|  | $V_{10}/V_5$ | 0.91 | 0.92 | 0.92 |
|  | Repose angle (°) | measurement incapable | measurement incapable | measurement incapable |
|  | Solvent insoluble rate (%) | 92 | 95 | 92 |
| Liquid powder Y | Main material | CSX-500 | MW-1 | MW-1 |
|  | Coating resin material | EF300 | — | — |
|  | Processing agent | — | Hexamethyl-disilazane | Hexamethyl-disilazane |
|  | Charge control agent | — | bontron E84 | bontron E84 |
|  | Coating process state | — | — | — |
|  |  | CRUX-system | — | — |
|  | (Solid state properties of liquid powder) |  |  |  |
|  | Particle size (nm) | 5.0 | 6.6 | 6.6 |
|  | Distribution of particle size Span | 0.6 | 0.7 | 0.6 |
|  | $V_{max}/V_0$ | 3.1 | 3.2 | 3.2 |
|  | $V_{10}/V_5$ | 0.93 | 0.92 | 0.92 |
|  | Repose angle (°) | measurement incapable | measurement incapable | measurement incapable |
|  | Solvent insoluble rate (%) | 92 | 95 | 95 |
|  | Relative humidity of gap gas (%) | 35 | 35 | 35 |
|  | Partition wall | existence | existence | existence |
|  | (Estimation of display function) |  |  |  |
|  | Minimum drive voltage (V) | 32 | 20 | 21 |
|  | Initial contrast ratio | 7.4 | 8.2 | 8.2 |
|  | Contrast ratio after 20000 times | 6.7 | 7.4 | 7.4 |
|  | Maintaining rate (%) | 90 | 90 | 90 |
|  | Contrast rate after 5 days left | 6.7 | 7.2 | 7.2 |
|  | Maintaining rate (%) | 87 | 88 | 88 |
|  | Response speed (m/sec) | 0.2 | 0.1 | 0.1 |

TABLE 3

|  |  | Comparative Example 1 | Comparative Example 2 | Comparative Example 3 |
|---|---|---|---|---|
| Liquid powder X | (Material of liquid powder) |  |  |  |
|  | Main material | MMA monomer | MMA monomer | commercially available toner (yellow) |
|  |  | $TiO_2$ | $TiO_2$ |  |
|  | Initiator (phr) | AIBN(0.5) | AIBN(0.5) | — |
|  | Charge control agent | bontron E89 | bontron E89 | — |
|  | Material of external additive A | silica H2000/4 | silica H2000/4 | — |
|  | Diameter (nm) | 20 | 20 | — |
|  | Material of external additive B | silica SS20 | silica SS20 | — |
|  | Diameter (nm) | 25 | 25 | — |
|  | External additive adhesion state: processing time of hybridizer (min.) | hybridizer 1 | hybridizer 30 | — |
|  | (Solid state properties of liquid powder) |  |  |  |
|  | Particle size (μm) | 4.7 | 4.9 | 7.2 |
|  | Distribution of particle size Span | 2.2 | 1.8 | 1.8 |
|  | $V_{max}/V_0$ | 1.2 | 1.2 | 1.2 |
|  | $V_{10}/V_5$ | 0.69 | 0.58 | 0.68 |
|  | Repose angle (°) | measurement incapable | measurement incapable | 30 |
|  | Solvent insoluble rate (%) | 91 | 92 | 90 |
| Liquid powder Y | (Material of liquid powder) |  |  |  |
|  | Main material | styrene monomer | styrene monomer | commercially available toner (black) |
|  |  | azo-series compound | azo-series compound |  |
|  | Initiator (phr) | AIBN(0.5) | AIBN(0.5) | — |
|  | Charge control agent | bontron N07 | bontron N07 | — |
|  | Material of external additive C | silica H2050 | silica H2050 | — |
|  | Diameter (nm) | 20 | 20 | — |

TABLE 3-continued

|  | Comparative Example 1 | Comparative Example 2 | Comparative Example 3 |
|---|---|---|---|
| Material of external additive B | silica SS20 | silica SS20 | — |
| Diameter (nm) | 25 | 25 | — |
| External additive adhesion state: | hybridizer | hybridizer | — |
| processing time of hybridizer (min.) | 1 | 30 | — |
| (Solid state properties of liquid powder) |  |  |  |
| Particle size (µm) | 4.8 | 5.0 | 6.9 |
| Distribution of particle size Span | 2.2 | 1.8 | 1.8 |
| $V_{max}/V_0$ | 1.2 | 1.2 | 1.2 |
| $V_{10}/V_5$ | 0.69 | 0.59 | 0.70 |
| Repose angle (°) | measurement incapable | measurement incapable | 30 |
| Solvent insoluble rate (%) | 92 | 90 | 90 |
| Relative humidity of gap gas (%) | 35 | 35 | 35 |
| Partition wall | none | existence | existence |
| (Estimation of display function) |  |  |  |
| Minimum drive voltage (V) | 95 | 88 | 125 |
| Initial contrast ratio | 8.80 | 9.00 | 6.70 |
| Contrast ratio after 20000 times | 4.93 | 4.59 | 3.35 |
| Maintaining rate (%) | 56 | 51 | 50 |
| Contrast rate after 5 days left | 4.40 | 4.32 | 3.15 |
| Maintaining rate (%) | 50 | 48 | 47 |
| Response speed (m/sec) | 11.0 | 8.1 | 8.9 |

EXAMPLE 21

(Production of Liquid Powder)

Two kinds of the liquid powders (liquid powder X, liquid powder Y) were prepared.

The liquid powder X was produced as follows. At first, methyl methacrylate monomer, $TiO_2$ (20 phr), charge control agent bontron E89 (Orient Chemical Industries, Ltd.: 5 phr), initiator AIBN (0.5 phr) were suspended and polymerized. After that, particle sizes of the polymerized particles were aligned by using an alignment device. Then, by using hybridizer (Nara Machinery Co., Ltd.), the polymerized particles, external additive A (silica H2000, Wacker Ltd.) and external additive B (silica SS20, Japan Silica Ltd.) were set therein and treated at 4800 rpm for 5 minuets, so that the external additives were fixed on a surface of the polymerized particles to obtain the liquid powder.

The liquid powder Y was produced as follows. At first, styrene monomer, azo compounds (5 phr), charge control agent bontron N07 (Orient Chemical Industries, Ltd.: 5 phr), initiator AIBN (0.5 phr) were suspended and polymerized. After that, particle sizes of the polymerized particles were aligned by using an alignment device. Then, by using hybridizer (Nara Machinery Co., Ltd.), the polymerized particles, external additive C (silica H2050, Wacker Ltd.) and external additive B (silica SS20, Japan Silica Ltd.) were set therein and treated at 4800 rpm for 5 minuets, so that the external additives were fixed on a surface of the polymerized particles to obtain the liquid powder.

The solid state properties of the liquid powder X and the liquid powder Y i.e. the above mentioned (1) average particle size and particle size distribution of the particle materials constituting the liquid powder, (2) ratio of apparent volume at maximum floating state of the liquid powder and apparent volume at none floating state, (3) time change of the apparent volume of the liquid powder ($V_{10}/V_5$), and (4) solvent insoluble rate of the liquid powder were shown in the following Table 4.

(Production of Display Device)

At first, a porous spacer was prepared. Then, the porous sheet was formed by preparing polyurethane sheet having a thickness of 200 µm, and punching mechanically the sheet to open a hole in such a manner that a hole diameter at the display side is 6 mm and a hole diameter at the none-display side is 5 mm and further the open rate becomes 80%. The hot melt adhesives were arranged at a peripheral portion of the porous sheet.

On a glass substrate to which indium oxide having a thickness of about 500 Å was arranged, the porous spacer was arranged. Then, the porous spacer was pressed with pressure by means of an application device heated at a temperature at which the hot melt adhesives were melted, and the porous spacer was connected to the glass substrate.

Then, the liquid powder X was tentatively adhered to the glass substrate on which the porous spacer is arranged by means of the electrostatic coating machine, and the liquid powder Y was tentatively adhered thereto. Further, the liquid powders were removed at a portion other than the hole for the porous spacer. Then, another glass substrate to which indium oxide electrode is arranged was opposed to the glass substrate, and a periphery of the glass substrate is connected by means of epoxy adhesive agent, so that the display device, in which the liquid powder is sealed, was produced.

The mixing ratio of the liquid powder X and the liquid powder Y was controlled to be even, and the filling rate of the liquid powder between the glass substrates was controlled to be 25 vol % as the volume occupied rate. Here, the gas surrounding the liquid powder in the gap between the substrates was an air having a relative humidity of 35% RH.

The estimation results of the display function in the display device were shown in the following Table 4.

EXAMPLE 22

The display device was produced in the same manner as that of the example 21, except that an addition amount of the initiator AIBN of the liquid powder X and the liquid powder Y are changed to 0.1 phr.

The solid state properties of the liquid powder X and the liquid powder Y and the estimation results of the display function in the display device were shown in the following Table 4. In this case, since an addition amount of the initiator AIBN was decreased, the solvent insoluble rate was decreased, and the stability after some time left was slightly deteriorated.

EXAMPLE 23

The display device was produced in the same manner as that of the example 21, except that the grading after suspending and polymerizing operation of the liquid powder X and the liquid powder Y is not performed.

The solid state properties of the liquid powder X and the liquid powder Y and the estimation results of the display function in the display device were shown in the following Table 4. In this case, since the grading was not performed, the particle size distribution Span was increased, and the durability was slightly deteriorated.

EXAMPLE 24

The display device was produced in the same manner as that of the example 21, except that the humidity of the air surrounding the liquid powder in the gap between the substrates was changed to 80% RH.

The solid state properties of the liquid powder X and the liquid powder Y and the estimation results of the display function in the display device were shown in the following Table 4. In this case, since the humidity of the air in the gap was high, the durability was slightly deteriorated.

EXAMPLE 25

The display device was produced in the same manner as that of the example 21, except that, in the manufactures of the liquid powder X and the liquid powder Y, a process condition of the hybridizer was changed to 4000 rpm for 2 minutes.

The solid state properties of the liquid powder X and the liquid powder Y and the estimation results of the display function in the display device were shown in the following Table 4. In this case, since the process condition of hybridizer was changed and thus the liquid powder state was deteriorated, the drive voltage became high, the durability was deteriorated and the response speed became slow.

EXAMPLE 26

The display device was produced in the same manner as that of the example 21, except that, in the manufactures of the liquid powder X and the liquid powder Y, a process condition of the hybridizer was changed to 4000 rpm for 25 minutes.

The solid state properties of the liquid powder X and the liquid powder Y and the estimation results of the display function in the display device were shown in the following Table 5. In this case, since the process condition of hybridizer was changed and thus the liquid powder state was deteriorated, the drive voltage became high, the durability was deteriorated and the response speed became slow.

EXAMPLE 27

The display device was produced in the same manner as that of the example 21, except that the hole diameter at the none-display side was also 6 mm as is the same as the display side. The solid state properties of the liquid powder X and the liquid powder Y and the estimation results of the display function in the display device were shown in the following Table 5. In this case, since the hole diameters at the display side and at the none-display side were even, the response speed slightly became slow.

COMPARATIVE EXAMPLE 11

The display device was produced in the same manner as that of the example 21, except that the porous spacer was not used. The solid state properties of the liquid powder X and the liquid powder Y and the estimation results of the display function in the display device were shown in the following Table 5. In this case, since the colony (agglutination) of the liquid powder was generated, the durability was deteriorated.

COMPARATIVE EXAMPLE 12

The display device was produced in the same manner as that of the example 21, except that the porous spacer was not used and, instead of the liquid powder X and the liquid powder Y, use was made of commercially available toner for electrophotography. The solid state properties of the commercially available toner for electrophotography and the estimation results of the display function in the display device were shown in the following Table 5. From the results, it was understood that the liquid powder state was deteriorated, the drive voltage became high, the durability was deteriorated and the response speed became slow.

TABLE 4

| | | Example 21 | Example 22 | Example 23 |
|---|---|---|---|---|
| Liquid powder X | (Material of liquid powder) | | | |
| | Main material | MMA monomer | MMA monomer | MMA monomer |
| | | $TiO_2$ | $TiO_2$ | $TiO_2$ |
| | Initiator (phr) | AIBN(0.4) | AIBN(0.1) | AIBN(0.4) |
| | Charge control agent | bontron 89 | bontron 89 | bontron 89 |
| | Material of external additive A | silica H2000 | silica H2000 | silica H2000 |
| | Diameter (nm) | 20 | 20 | 20 |
| | Material of external additive B | silica SS20 | silica SS20 | silica SS20 |
| | Diameter (nm) | 25 | 25 | 25 |
| | External additive adhesion state: | | | |

TABLE 4-continued

|  |  |  |  |  |
|---|---|---|---|---|
|  | processing time of hybridizer (min.) | 6 | 6 | 6 |
|  | (Solid state properties of liquid powder) |  |  |  |
|  | Particle size (μm) | 3.2 | 4.2 | 4.0 |
|  | Distribution of particle size Span | 1.5 | 1.7 | 5.2 |
|  | $V_{max}/V_0$ | 3.2 | 2.7 | 2 |
|  | $V_{10}/V_5$ | 0.90 | 0.88 | 0.80 |
|  | Solvent insoluble rate (%) | 92 | 48 | 91 |
| Liquid powder Y | (Material of liquid powder) |  |  |  |
|  | Main material | styrene monomer azo-series compound | styrene monomer azo-series compound | styrene monomer azo-series compound |
|  | Initiator (phr) | AIBN(0.4) | AIBN(0.1) | AIBN(0.4) |
|  | Charge control agent | bontron N07 | bontron N07 | bontron N07 |
|  | Material of external additive C | silica H2050 | silica H2050 | silica H2050 |
|  | Diameter (nm) | 20 | 20 | 20 |
|  | Material of external additive B | silica SS20 | silica SS20 | silica SS20 |
|  | Diameter (nm) | 25 | 25 | 25 |
|  | External additive adhesion state: processing time of hybridizer (min.) | 6 | 6 | 6 |
|  | (Solid state properties of liquid powder) |  |  |  |
|  | Particle size (μm) | 3.3 | 4.1 | 4.2 |
|  | Distribution of particle size Span | 1.6 | 1.8 | 5.2 |
|  | $V_{max}/V_0$ | 3.0 | 2.6 | 2.1 |
|  | $V_{10}/V_5$ | 0.91 | 0.88 | 0.88 |
|  | Solvent insoluble rate (%) | 92 | 49 | 91 |
|  | Relative humidity of gap gas (%) | 35 | 35 | 35 |
|  | Spacer open rate (%) | 80 | 80 | 80 |
|  | Pore size ratio (display side/non-display side) | 1.2 | 1.2 | 1.2 |
|  | (Estimation of display function) |  |  |  |
|  | Minimum drive voltage (V) | 21 | 25 | 43 |
|  | Initial contrast ratio | 8.9 | 8.9 | 8.7 |
|  | Contrast ratio after 10000 times | 8.18 | 7.83 | 8.00 |
|  | Maintaining rate (%) | 92 | 89 | 87 |
|  | Colony generation after 10000 times | none | none | none |
|  | Contrast rate after 5 days left | 7.92 | 6.50 | 6.26 |
|  | Maintaining rate (%) | 89 | 73 | 72 |
|  | Response speed (m/sec) | 0.1 | 0.3 | 0.3 |

|  |  | Example 24 | Example 25 |
|---|---|---|---|
| Liquid powder X | (Material of liquid powder) |  |  |
|  | Main material | MMA monomer TiO$_2$ | MMA monomer TiO$_2$ |
|  | Initiator (phr) | AIBN(0.4) | AIBN(0.4) |
|  | Charge control agent | bontron 89 | bontron 89 |
|  | Material of external additive A | silica H2000 | silica H2000 |
|  | Diameter (nm) | 20 | 20 |
|  | Material of external additive B | silica SS20 | silica SS20 |
|  | Diameter (nm) | 25 | 25 |
|  | External additive adhesion state: processing time of hybridizer (min.) | 6 | 2 |
|  | (Solid state properties of liquid powder) |  |  |
|  | Particle size (μm) | 3.2 | 4.8 |
|  | Distribution of particle size Span | 1.5 | 2.3 |
|  | $V_{max}/V_0$ | 3.2 | 1.8 |
|  | $V_{10}/V_5$ | 0.90 | 0.70 |
|  | Solvent insoluble rate (%) | 92 | 91 |
| Liquid powder Y | (Material of liquid powder) |  |  |
|  | Main material | styrene monomer azo-series compound | styrene monomer azo-series compound |
|  | Initiator (phr) | AIBN(0.4) | AIBN(0.4) |

TABLE 4-continued

|  |  |  |
|---|---|---|
| Charge control agent | bontron N07 | bontron N07 |
| Material of external additive C | silica H2050 | silica H2050 |
| Diameter (nm) | 20 | 20 |
| Material of external additive B | silica SS20 | silica SS20 |
| Diameter (nm) | 25 | 25 |
| External additive adhesion state: processing time of hybridizer (min.) | 6 | 2 |
| (Solid state properties of liquid powder) | | |
| Particle size (μm) | 3.3 | 4.7 |
| Distribution of particle size Span | 1.6 | 2.2 |
| $V_{max}/V_0$ | 3.1 | 1.9 |
| $V_{10}/V_5$ | 0.91 | 0.70 |
| Solvent insoluble rate (%) | 92 | 92 |
| Relative humidity of gap gas (%) | 80 | 35 |
| Spacer open rate (%) | 80 | 80 |
| Pore size ratio (display side/non-display side) | 1.2 | 1.2 |
| (Estimation of display function) | | |
| Minimum drive voltage (V) | 37 | 90 |
| Initial contrast ratio | 8.5 | 8.5 |
| Contrast ratio after 10000 times | 6.89 | 6.46 |
| Maintaining rate (%) | 81 | 76 |
| Colony generation after 10000 times | none | slightly existence |
| Contrast rate after 5 days left | 5.95 | 6.46 |
| Maintaining rate (%) | 70 | 70 |
| Response speed (m/sec) | 2.1 | 11 |

TABLE 5

|  |  | Example 26 | Example 27 |
|---|---|---|---|
| Liquid powder X | (Material of liquid powder) | | |
|  | Main material | MMA monomer TiO$_2$ | urethane TiO$_2$ |
|  | Initiator (phr) | AIBN(0.4) | AIBN(0.4) |
|  | Charge control agent | bontron 89 | bontron 89 |
|  | Material of external additive A | silica H2000 | silica H2000 |
|  | Diameter (nm) | 20 | 20 |
|  | Material of external additive B | silica SS20 | silica SS20 |
|  | Diameter (nm) | 25 | 25 |
|  | External additive adhesion state: processing time of hybridizer (min.) | 25 | 6 |
|  | (Solid state properties of liquid powder) | | |
|  | Particle size (μm) | 4.8 | 3.2 |
|  | Distribution of particle size Span | 1.7 | 1.5 |
|  | $V_{max}/V_0$ | 1.7 | 3.2 |
|  | $V_{10}/V_5$ | 0.7 | 0.90 |
|  | Solvent insoluble rate (%) | 92 | 92 |
| Liquid powder Y | (Material of liquid powder) | | |
|  | Main material | styrene monomer azo-series compound | styrene monomer azo-series compound |
|  | Initiator (phr) | AIBN(0.4) | AIBN(0.4) |
|  | Charge control agent | bontron 07 | bontron 07 |
|  | Material of external additive C | silica H2050 | silica H2050 |
|  | Diameter (nm) | 20 | 20 |
|  | Material of external additive B | silica SS20 | silica SS20 |
|  | Diameter (nm) | 25 | 25 |
|  | External additive adhesion state: processing time of hybridizer (min.) | 25 | 6 |
|  | (Solid state properties of liquid powder) | | |
|  | Particle size (μm) | 4.9 | 3.3 |
|  | Distribution of particle size Span | 1.8 | 1.6 |
|  | $V_{max}/V_0$ | 1.9 | 3.1 |
|  | $V_{10}/V_5$ | 0.70 | 0.91 |
|  | Solvent insoluble rate (%) | 92 | 92 |
|  | Relative humidity of gap gas (%) | 35 | 35 |

TABLE 5-continued

| | | | |
|---|---|---|---|
| | Spacer open rate (%) | 80 | 80 |
| | Pore size ratio (display side/non-display side) | 1.2 | 1.0 |
| | (Estimation of display function) | | |
| | Minimum drive voltage (V) | 80 | 22 |
| | Initial contrast ratio | 8.7 | 8.9 |
| | Contrast ratio after 10000 times | 6.7 | 7.39 |
| | Maintaining rate (%) | 77 | 83 |
| | Colony generation after 10000 times | slightly existence | slightly existence |
| | Contrast rate after 5 days left | 4.18 | 7.12 |
| | Maintaining rate (%) | 48 | 80 |
| | Response speed (m/sec) | 8.1 | 0.2 |

| | | Comparative Example 11 | Comparative Example 12 |
|---|---|---|---|
| Liquid powder X | (Material of liquid powder) | | |
| | Main material | MMA monomer | commercially available toner (yellow) |
| | | TiO$_2$ | |
| | Initiator (phr) | AIBN(0.4) | |
| | Charge control agent | bontron 89 | |
| | Material of external additive A | silica H2000 | |
| | Diameter (nm) | 20 | |
| | Material of external additive B | silica SS20 | |
| | Diameter (nm) | 25 | |
| | External additive adhesion state: processing time of hybridizer (min.) | 6 | |
| | (Solid state properties of liquid powder) | | |
| | Particle size (μm) | 3.2 | 7.2 |
| | Distribution of particle size Span | 1.5 | 1.8 |
| | $V_{max}/V_0$ | 1.3 | 1.2 |
| | $V_{10}/V_5$ | 0.90 | 0.68 |
| | Solvent insoluble rate (%) | 92 | 90 |
| Liquid powder Y | (Material of liquid powder) | | |
| | Main material | styrene monomer | commercially available toner (black) |
| | | azo-series compound | |
| | Initiator (phr) | AIBN(0.4) | |
| | Charge control agent | bontron 07 | |
| | Material of external additive C | silica H2050 | |
| | Diameter (nm) | 20 | |
| | Material of external additive B | silica SS20 | |
| | Diameter (nm) | 25 | |
| | External additive adhesion state: processing time of hybridizer (min.) | 6 | |
| | (Solid state properties of liquid powder) | | |
| | Particle size (μm) | 3.3 | 6.9 |
| | Distribution of particle size Span | 1.6 | 1.8 |
| | $V_{max}/V_0$ | 3.1 | 1.2 |
| | $V_{10}/V_5$ | 0.91 | 0.70 |
| | Solvent insoluble rate (%) | 92 | 90 |
| | Relative humidity of gap gas (%) | 35 | 35 |
| | Spacer open rate (%) | | |
| | Pore ratio (display side/non-display side) | | |
| | (Estimation of display function) | | |
| | Minimum drive voltage (V) | 25 | 125 |
| | Initial contrast ratio | 8.8 | 6.4 |
| | Contrast ratio after 10000 times | 6.16 | 3.52 |
| | Maintaining rate (%) | 70 | 47 |
| | Colony generation after 10000 times | existence | existence |
| | Contrast rate after 5 days left | 4.05 | 3.00 |
| | Maintaining rate (%) | 46 | 47 |
| | Response speed (m/sec) | 0.2 | 8.9 |

INDUSTRIAL APPLICABILITY

According to the first aspect of the invention, since a liquid powder composed of a solid material stably floating as a dispersant in a gas and exhibiting a high fluidity in an aerosol state is sealed between opposed substrates and the liquid powder is moved, it is possible to obtain an image display device and method which can realize rapid response and also which can achieve inexpensive and stable construction and further decrease the drive voltage.

Moreover, according to the second aspect of the invention, since a porous spacer is arranged between opposed substrates, a liquid powder composed of a solid material stably floating as a dispersant in gas and exhibiting a high fluidity in an aerosol state is sealed, and the liquid powder is moved, it is possible to obtain an image display device which can achieve inexpensive construction, improve durability and decrease a drive voltage.

The invention claimed is:

1. An image display device characterized in that a liquid powder composed of a solid material stably floating as a dispersant in a gas and exhibiting a high fluidity in an aerosol state is sealed between opposed substrates, at least one substrate being transparent, and the liquid powder is moved,
wherein the liquid powder does not have a repose angle as an index indicating its fluidity.

2. The image display device according to claim 1, wherein an apparent volume in a maximum floating state is two times or more than that in none floating state.

3. The image display device according to claim 1, wherein a time change of the apparent volume of the liquid powder satisfies the floating formula:

$$V_{10}/V_5 > 0.8;$$

here, $V_5$ indicates the apparent volume (cm$^3$) of the liquid powder after 5 minutes from the maximum floating state; and $V_{10}$ indicates the apparent volume (cm$^3$) of the liquid powder after 10 minutes from the maximum floating state.

4. The image display device according to claim 1, wherein an average particle size d(0.5) of a particle material constituting the liquid powder is 0.1-20 μm.

5. The image display device according to claim 1, wherein a particle size distribution Span of the particle material constituting the liquid powder, which is defined by the following formula, is not more than 5:

$$\text{Span} = (d(0.9) d(0.1))/d(0.5);$$

(here, d(0.5) means a value of the particle size expressed by μm wherein an amount of the particle material constituting the liquid powder having the particle size larger than this value is 50% and an amount of the particle material constituting the liquid powder having the particle size expressed by μm wherein an amount of the particle material constituting the liquid powder having a particle size smaller than this value is 10%, and d(0.9) means a value of the particle size expressed by μm wherein an amount of the particle material constituting the liquid powder having the particle size smaller than this value is 90%).

6. The image display device according to claim 1, wherein the liquid powder is immersed into a solvent before the liquid powder is sealed between the opposed substrates,
wherein a weight of the liquid powder before being immersed into the solvent is A,
wherein a weight of resin components after the liquid powder is immersed into the solvent at 25° C. for 24 hours is B,
wherein a solvent insoluble rate of the liquid powder is defined by the following formula:

solvent insoluble rate (%)=(B/A)×100, and wherein the solvent insoluble rate is not less than 50%.

7. The image display device according to claim 1, wherein the liquid powder is a material, a surface of which is bonded by inorganic fine particles having an average particle size of 20-100 nm.

8. The image display device according to claim 7, wherein the liquid powder is a material, a surface of which is bonded by two or more kinds of inorganic fine particles.

9. The image display device according to claim 7, wherein the inorganic fine particles are treated by silicon oil.

10. The image display device according to claim 1, wherein the liquid powder is sealed between the substrates by means of an electrostatic coating apparatus.

11. The image display device according to claim 1, wherein a space between the opposed substrates is filled with a gas having a relative humidity at 25° C. of not more than 60% RH.

12. The image display device according to claim 1, wherein the image display device is formed by a plurality of display cells.

13. The image display device according to claim 1, wherein a partition wall is formed by one of a screen-printing method, a sandblast method, a photo-conductor paste method and an additive method.

14. The image display device according to claim 13, wherein the partition wall has a cantilever structure.

15. A method of displaying an image characterized in that a liquid powder composed of a solid material stably floating as a dispersant in a gas and exhibiting a high fluidity in an aerosol state is sealed between opposed substrates, at least one substrate being transparent, and the liquid powder is moved;
wherein the liquid powder does not have a repose angle as an index indicating its fluidity.

16. An image display device characterized in that a porous spacer is arranged between opposed substrates, at least one substrate being transparent, a liquid powder composed of a solid material stably floating as a dispersant in gas and exhibiting a high fluidity in an aerosol state is sealed, and the liquid powder is moved.

17. The image display device according to claim 16, wherein the liquid powder does not have a repose angle as an index indicating its fluidity.

18. The image display device according to claim 16, wherein hot melt adhesive is applied on an outer portion of the porous spacer.

19. The image display device according to claim 16, wherein an open rate of the porous spacer at a display side having a transparent substrate is 50-95%.

20. The image display device according to claim 16, wherein pore sizes of the porous spacer are different at a display side and at a none display side, and (pore size a display side)/(pore size at none display side)>1.1 is satisfied.

21. The image display device according to claim 16, wherein an apparent volume in a maximum floating state is two times or more than that in none floating state.

22. The image display device according to claim 16, wherein a time change of the apparent volume of the liquid powder satisfies the floating formula:

$$V_{10}/V_5 > 0.8;$$

here, $V_5$ indicates the apparent volume (cm$^3$) of the liquid powder after 5 minutes from the maximum floating state; and $V_{10}$ indicates the apparent volume (cm$^3$) of the liquid powder after 10 minutes from the maximum floating state.

23. The image display device according to claim 16, wherein an average particle size d(0.5) of a particle material constituting the liquid powder is 0.1-20 μm.

24. The image display device according to claim 16, wherein a particle size distribution Span of the particle material constituting the liquid powder, which is defined by the following formula, is not more than 5:

Span=(*d*(0.9)*d*(0.1))/*d*(0.5);

(here, d(0.5) means a value of the particle size expressed by μm wherein an amount of the particle material constituting the liquid powder having the particle size larger than this value is 50% and an amount of the particle material constituting the liquid powder having the particle size expressed by μm wherein an amount of the particle material constituting the liquid powder having a particle size smaller than this value is 10%, and d(0.9) means a value of the particle size expressed by μm wherein an amount of the particle material constituting the liquid powder having the particle size smaller than this value is 90%).

25. The image display device according to claim 16, wherein a solvent insoluble rate of the liquid powder, which is defined by the following formula, is not less than 50%:

solvent insoluble rate (%)=(*B*/*A*)×100;

(here, A is a weight of the liquid powder before being immersed into the solvent and B is a weight of resin components after the liquid powder is immersed into good solvent at 25° C. for 24 hours).

26. The image display device according to claim 16, wherein the liquid powder is a material, a surface of which is bonded by inorganic fine particles having an average particle size of 20-100 nm.

27. The image display device according to claim 26, wherein the liquid powder is a material, a surface of which is bonded by two or more kinds of inorganic fine particles.

28. The image display device according to claim 26, wherein the inorganic fine particles are treated by silicon oil.

29. The image display device according to claim 16, wherein the liquid powder is sealed between the substrates by means of an electrostatic coating apparatus.

30. The image display device according to claim 16, wherein a space between the opposed substrates is filled with a gas having a relative humidity at 25° C. of not more than 60%.

* * * * *